United States Patent
Greenspan et al.

(10) Patent No.: US 9,784,587 B1
(45) Date of Patent: Oct. 10, 2017

(54) POLICY-BASED CONVERGENCE POINT RECOMMENDATIONS FOR CONVOYS

(71) Applicants: Steven L. Greenspan, Scotch Plains, NJ (US); Maria C. Velez-Rojas, San Jose, CA (US); Serguei Mankovskii, Morgan Hill, CA (US)

(72) Inventors: Steven L. Greenspan, Scotch Plains, NJ (US); Maria C. Velez-Rojas, San Jose, CA (US); Serguei Mankovskii, Morgan Hill, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/086,241

(22) Filed: Mar. 31, 2016

(51) Int. Cl.
*G06F 19/00* (2011.01)
*G01C 21/34* (2006.01)

(52) U.S. Cl.
CPC .............................. *G01C 21/3438* (2013.01)

(58) Field of Classification Search
CPC ... G01C 21/3438; G06T 7/2093; G06T 7/508; G06T 7/60; G06K 7/20
USPC ........................................................ 701/522
See application file for complete search history.

(56) References Cited

U.S. PATENT DOCUMENTS

| 5,870,493 | A  | * | 2/1999  | Vogl ..................... | G06K 9/4628 |
|           |    |   |         |                          | 382/195     |
| 8,539,359 | B2 | * | 9/2013  | Rapaport ............... | G06Q 10/10  |
|           |    |   |         |                          | 709/217     |
| 9,246,777 | B2 | * | 1/2016  | Murase ................... | H04L 43/00  |
| 9,530,222 | B2 | * | 12/2016 | Greenspan ............. | G06Q 10/08  |

OTHER PUBLICATIONS

Demir et al., Multicamera Audio-Visual Analysis of Dance Figures Using Segmented Body Model, 2007, IEEE, p. 2115-2119.*
Biswas et al., A Novel Motion Estimation Algorithm Using Phase Plane Correlation for Frame Rate Conversion, 2002, IEEE, p. 492-496.*

* cited by examiner

*Primary Examiner* — Mcdieunel Marc
(74) *Attorney, Agent, or Firm* — Baker Botts L.L.P.

(57) ABSTRACT

A method includes applying a correlation rule defining a correlation relationship between a first and second object and determining, using a processor, whether a first motion vector of the first object is correlated at a threshold level of correlation with a second motion vector of the second object, the correlation relationship between the first and second objects identifying the threshold level of correlation between the first and second motion vectors. The method also includes, in response to determining that the first motion vector is not correlated at the threshold level with the second motion vector, determining a convergence point for the first and second objects in accordance with a policy. The method further includes transmitting instructions for arriving at the convergence point to the first and second objects.

20 Claims, 18 Drawing Sheets

| OBJECT A | |
|---|---|
| TIME TO CONVERGENCE POINT (MINUTES) | PROBABILITY OF ON-TIME ARRIVAL |
| 15 | 70% |
| 20 | 22% |
| 25 | 8% |

FIG. 14A

| OBJECT B | |
|---|---|
| TIME TO CONVERGENCE POINT (MINUTES) | PROBABILITY OF ON-TIME ARRIVAL |
| 16 | 35% |
| 18 | 40% |
| 23 | 16% |
| 30 | 9% |

FIG. 14B

| TIME TO CONVERGENCE (MINUTES) | PROBABILITY OF ON-TIME CONVERGENCE |
|---|---|
| 15 | 0.0% |
| 16 | 24.5% |
| 18 | 28.0% |
| 20 | 16.5% |
| 23 | 14.7% |
| 25 | 7.3% |
| 30 | 9.0% |

FIG. 14C

POLICY-BASED CONVERGENCE POINT RECOMMENDATIONS FOR CONVOYS

BACKGROUND

The present disclosure relates to the Internet of Things (IoT) and, more specifically, to systems and methods for detecting divergence or convergence of related objects in motion and applying asymmetric rules.

As the so-called Internet of Things expands, an increasing number of smart devices have been developed to interconnect within the existing Internet infrastructure or other networks. Such devices may be used to collect information and to automate a growing number of important tasks in a variety of fields.

Known supply chain monitoring systems allow users to track the location of multiple items in real-time as independent shipments. Such systems may track a shipping order, for example, and may let a user know when the item(s) are due and if the order has been split. Each separate component of a split order may be assigned its own due date. Known luggage tracking systems use global positioning satellite (GPS) data to allow users to ping a device, which packed in the users' luggage, for the device's location when the luggage has been misplaced or stolen. Similarly, known child tracking systems may monitor the location of a person who is wearing a location device using GPS data. In some implementations, non-GPS devices for child monitoring may alarm whenever the child (who is wearing a locator tag) wanders more than 30 feet from the parent (who is wearing the paired wireless transmitter).

BRIEF SUMMARY

According to an aspect of the present disclosure, a method may include several processes. In particular, the method may include applying a correlation rule defining a correlation relationship between a first and second object. The method also includes determining, using a processor, whether a first motion vector of the first object is correlated at a threshold level of correlation with a second motion vector of the second object, the correlation relationship between the first and second objects identifying the threshold level of correlation between the first and second motion vectors. The method further includes, in response to determining that the first motion vector is not correlated at the threshold level with the second motion vector, determining a convergence point for the first and second objects in accordance with a policy. The method also includes transmitting instructions for arriving at the convergence point to the first and second objects.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

FIGS. 14A-C illustrate example tables showing time to convergence and probability information associated with the each object arriving at a convergence point in the specified amount of time.

DETAILED DESCRIPTION

Figure 1:
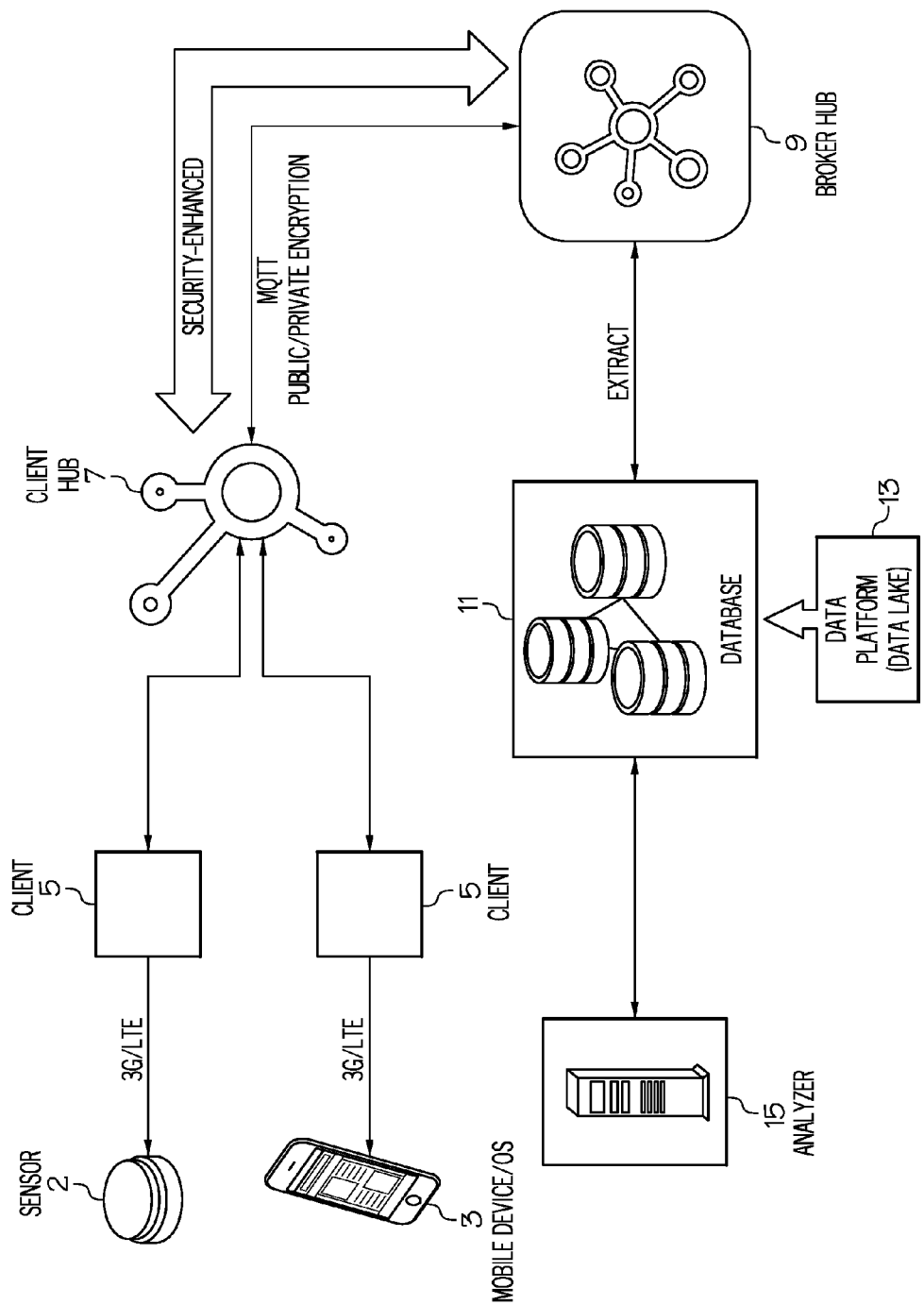
FIG. 1 is a schematic representation of a network on which motion monitoring processes and convergence/divergence monitoring processes may be implemented.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to mobility and the Internet of Things (IoT), systems and methods disclosed herein may be related to any field. Moreover, certain examples disclosed herein may be described with respect to commercial delivery services, consumer electronics, or any other field that may involve movable components. Certain embodiments described in the present disclosure are merely provided as example implementations of the processes described herein.

Various methods for tracking items in real-time, monitoring absolute location through GPS or cellular tower triangulation, or detecting when two items surpass some distance threshold may exist. Nevertheless, such methods have traditionally focused on tracking, monitoring, or detecting objects independently of one another. Systems and methods disclosed herein may use geo-location technologies and a policy engine to track and notify users when two or more components (e.g., network-enabled devices, goods) are following different paths, when a plurality of components are diverging from a set path or expected arrival time, or when a plurality of components are converging to a set path or expected arrival time.

In certain systems and methods disclosed herein, an administrator or owner of the components being tracked/monitored may construct/specify correlation rules, the system itself may use machine learning or other techniques to learn/detect rules, such as asymmetric correlation rules, or some combination of constructed/specified and learned/detected rules may be used. Such systems may detect the anomalous divergence of motion vectors for the components, the likely convergence of the components at a destination position, and/or the divergence from an expected path/route.

In certain embodiments, objects that are separated from one or more other objects or objects that deviate from an expected path/route are analyzed to determine one or more likely convergence points. The likely convergence points describe physical locations where the objects are likely to convene, such as at an intersection point on two independent routes. This analysis may take into account a variety of factors, such as, for example, a likelihood that each object maintains its current expected path, a likelihood that each object maintains is current speed or rate of travel, a likelihood that each object is not or does not become impaired in some manner, and various other factors that are associated with moving objects, terrain, environments, and coordination of the same. The convergence points and respective probabilities associated with each convergence point are analyzed to determine a most likely convergence point. This information can be aggregated and presented to a user. For example, this information can be presented to an operator of a vehicle that is associated with a first object in order to intercept or anticipate a convergence time and point and optimize various other variables associated with intercepting or meeting another moving object.

The teachings of the present disclosure may reference specific example "objects." For example, an "object" can include a car, truck, boat, plane, rail vehicle, transport, and the like. In certain embodiments, "object" may refer to a smartphone, global positioning system (GPS) device, satellite communication terminal, radio communication terminal, or any other device capable of estimating or tracking location or motion data. For example, a mobile device may be equipped with an accelerometer and GPS system for interfacing with applications or websites. Any movable or moving object with such capabilities is contemplated within the scope of the present disclosure.

In a first example, systems and methods disclosed herein may notify users when their automobile is moving and on a different path than such users. For example, an office worker may drive to work with a smart phone in her pocket, may park her car, and may take a shuttle to her office. At lunch she may walk to a nearby restaurant. During lunch, systems and methods disclosed herein may send, and the office worker may receive, a notification that the office worker's car is in motion (or that the laptop the office worker left in her car is in motion). Such systems and methods may include an application on the office worker's smart phone, for example. At this point, such systems and methods might allow the office worker to notify the police, place the car is no-drive mode (e.g., which would allow the car to drive until it is parked), or to take other actions to restrict the use of the car or promote the car's timely return. Other examples may include pairing together laptops and smart phones or pairing together devices associated with multiple children who are supposed to be traveling together.

In a second example, systems and methods disclosed herein may monitor a plurality of components that are diverging unexpectedly and generate alerts in response to such divergence. For example, in a supply chain, the motion of a container or object with a GPS transmitter may be correlated with the motion of other containers and/or the vessel/vehicle that have been fitted with a GPS locator. Separation in geo-location between the containers themselves and/or between a container and the vessel/vehicle may trigger an alarm.

In a third example, systems and methods disclosed herein may monitor a plurality of components that are converging on a destination and perform an automated process in response to such convergence (e.g., supply chain automation). For example, in a supply chain, the motion of a container or object with a GPS transmitter can be correlated with the motion of other containers and/or the vessel/vehicle that have been fitted with a GPS location. Automated and/or manual processes may be invoked when separate containers, moving from different locations but destined for a common point, begin to converge.

In a fourth example, systems and methods disclosed herein may monitor a plurality of components that are supposed to be moving along a particular route. For example, cargo may be disposed in a particular crate, the particular crate may be disposed on a particular vehicle, and the vehicle may be required to follow a particular route. Divergence of one or more of the cargo, crate, or vehicle from one another may indicate lost or stolen items and may trigger a notification indicating such anomaly. Moreover, divergence of one or more of the cargo, crate, or vehicle from the particular route also may indicate lost or stolen items and may similarly trigger a notification indicating such anomaly. In some implementations, divergence of one or more of the cargo, crate, or vehicle from an expected position along the particular route at a particular time (e.g., divergence from a time-bound location) also may indicate lost or stolen items and may similarly trigger a notification indicating such anomaly.

In yet another example embodiment, systems and methods disclosed herein receive position, capability, and environment data from one or more objects, such as automobiles. A convergence point for the objects is determined. In certain embodiments, the convergence point is determined based in part on a policy that specifies particular attributes for optimization. For example, the policy can specify that the convergence point is to be determined so as to optimize the time it takes each object to arrive at the convergence point or to minimize the distance that each object travels. In certain embodiments, the terrain or environment is considered when making such a determination. For example, information regarding current or projected traffic information or known road blocks (e.g., natural, short term, or long term) is used to determine a convergence point. Estimated times for each object to reach the determined convergence point are determined. In certain embodiments, a variety of data is used to determine such time estimates, such as environment data including traffic information, object status data (e.g., if one or more of the objects is immobile or disabled), capability data, location and motion data regarding other objects, and the like. The estimated time to converge is also estimated based on the estimated times for the objects to arrive at the convergence point. The time data and route information is transmitted to one or more of the objects. For example, a courier is attempting to deliver a package to an executive before he or she arrives at a meeting. The system determines a convenient, efficient, and timely convergence point for the courier to deliver the package to the executive at or before the meeting location so that the executive can review the material. Estimated arrival times and route information is transmitted to each party so that a decision can be made as to whether to modify the route.

In yet another example embodiment, and with reference to the example described above, a probability is determined with respect to one or more of the determinations, estimates, predictions, or arrival times. For example, an indication of the likelihood that each party will arrive at the determined convergence point at the estimated time is determined. As another example, an indication of the likelihood that one party will take a particular route is estimated. In certain embodiments, historic utilization and other current indicators are used to make predictions. For example, if a user generally takes a particular route home, to the airport, or to some other destination, the system can generalize from this historic route information that the user will likely take such a route again. In certain embodiments, traffic and terrain information is used in calculating probabilities. For example, the system may detect that traffic usually occurs on the particular route and may decrease the probability that the user will take a particular route based on the perceived risk of traffic aggregating at a particular time of day or due to a particular event. For example, the system may know that the user takes a different route that is actually longer than the shortest possible route in order to avoid traffic and arrive at a particular destination in a shorter amount of time than otherwise possible. Various other types of probability information can be determined from other historic and current data inputs to the system, such as those information sources described above.

Probability information can be transmitted to end users for use in determining whether to meet at the particular convergence point, or whether to opt for a higher probability convergence point. For example, the courier may be delivering the package to the executive without knowledge of the executive. The courier can use the probability information regarding estimated travel tendencies of the user in order to estimate whether to go to a particular convergence point in the hopes that he or she can deliver the package.

In certain embodiments, probability information is fed back into a navigation system for further route guidance processing and risk mitigation strategies. For example, the system may use the determined probabilities to determine a recommended convergence point based on the most likely convergence point, as well as many other factors describing characteristics of the objects, their environment, or operator tendencies. For example, the most likely convergence points can be combined with the policy preferences to formulate a probability table that describes the likelihood that each object will converge with the other object at a particular time. In certain embodiments, an amount of time that one of the objects may have to remain at the convergence point while stationary is also taken into consideration.

With reference to FIGS. 14A-C, several example tables showing an estimated time to convergence and probability information is illustrated in accordance with certain embodiments of the present disclosure. Specifically, table 14A shows this information for a particular object (object A), table 14B shows this information for object B, and table 14C shows this information for convergence between objects A and B. Probability information indicates the probability that each particular object will arrive at the convergence point. Table 14C shows the probability of an on-time convergence. In this instance, on-time may refer to the estimated arrival time, such as the estimated time of arrival of each object at the convergence point. The probability of an on-time arrival may combine the probabilities associated with each object arriving at the convergence point in the specified time.

In the context of yet another embodiment of the present disclosure, convergence point waiting time may present a liability. For example, certain missions or objectives involving convoys or caravans may prioritize protection and transportation of sensitive cargo, people, documents, munitions, information or the like. Operators of a convoy may wish to minimize the time spent waiting at the convergence point. In this scenario, early arrival at a convergence point by one or more of the converging objects may be considered a security risk. For example, such stationary waiting may allow for easier ambushes by wrong-doers, especially if the convergence point is known to the attackers beforehand. Wait time may allow nearby wrongdoers to gather and coordinate an attack on the stationary convoy. In certain embodiments, convergence points are dynamically assigned to minimize the likelihood of external users gaining convergence point information and minimizing the time that objects sit stationary at the convergence point.

In still another example embodiment, a correlation algorithm is used to determine when two objects traveling in a convoy become separated or diverge from each other. Each object is assessed for any anomalies. For example, two cars traveling in close proximity to each other and making similar stops may be determined to be in a "convoy" or group, or at least associated with each other. A correlation algorithm is used to determine when one or more of the objects in the group become separated from the other. In addition to position and location information the system also receives information regarding various systems associated with each object. This information can be assessed to determine, for example, if the object has an impairment that would prevent it from continuing in the convoy. For example, if the object is parked at what appears to be the side of a road as indicated by location information for the object, while other objects in the convoy continue on, then the object may be considered to be disabled. System information associated with the object can be analyzed to determine a cause of the anomaly. For example, a tire pressure gauge or check indicates that the object has a flat tire. As another example, one object in a determined convoy may veer off course or become lost. The system applies the correlation algorithm to determine when this occurs.

Continuing on with the example above, once a divergent, disabled, lost, or separated object is determined, the system determines, according to a policy in combination with other environmental and mission-specific factors that are also specified in the policy, whether to determine a convergence point for reuniting or remediating the lost convoy member. For example, certain missions may have a "no man left behind" policy. In this case a mutual convergence point that is convenient and safe for each member of the convoy is determined. As another example, a policy may indicate that a particular mission strategy prioritizes transporting at least one of the objects to the destination as quickly as possible. As yet another example, efficiency of each convoy vehicle may be prioritized or optimized.

One or more of the above-disclosed examples may use GPS sensors, but systems and methods disclosed herein may utilize one or more other sensors (e.g., accelerometers, pressure sensors, temperature sensors). In systems and methods disclosed herein, the divergence or convergence of characteristics (e.g., GPS location, other sensor data) of related components or their environments may similarly trigger subsequent actions. In certain implementations disclosed herein, systems and methods may not depend on the absolute characteristics (e.g., absolute GPS position), for example, but rather on the change of the monitored characteristics in relation to other objects in the same set of objects (e.g., a divergence of the path followed by each object of a plurality of objects, a convergence of destination for each object of a plurality of objects). Convergence and divergence may be defined by absolute difference or by statistical properties such as N standard deviations from the norm, for example.

In particular implementations, systems and methods disclosed herein may be implemented as a client-hub architecture in which each sensor/device may communicate with a software client that may normalize the data format and, in turn, may communicate securely with a client hub that may aggregate data from multiple clients. The client hub may communicate securely with a broker hub which may then expose data to various subscribing databases. Various applications may then make use of the data in the databases. Message transport from the client onward may be accomplished using standard protocols, such as Message Queue Telemetry Transport (MQTT), for example. The client to sensor communication method may vary from implementation to implementation and may depend upon the sensor/device manufacturer.

In certain implementations, systems and methods disclosed herein may be implemented at several levels in the network/system architecture. For example, monitoring for divergence in the locations of several objects may take place at a client hub if all of the clients communicate with a single hub. In some implementations, systems and methods disclosed herein may be implemented as an application that may monitor data acquired by the database. The application may monitor the characteristics of various objects and may apply a set of rules to the acquired data. A policy engine may be used to describe the rule(s) and the consequences of violating or obeying the rule(s). A notification component may be used to send data to an application user-interface, which may include desktop, laptop, smart phone, and tablet graphical user interfaces (GUIs), for example; to send an email or text; and/or to communicate with other applications using an application program interface (API). The rules engine, for example, may be used to compare the behaviors (or characteristics) of several objects and to decide when and how to notify users or other applications when the behaviors (or characteristics) diverge/converge or are predicted to do so within some specified time interval.

Certain implementations of the present disclosure may utilize GPS-enabled, WiFi/Cellular transmitters that are attached to a plurality of objects in motion, and such transmitters may be used to track the relative positions of each of the plurality of objects in motion. Divergence from or convergence by objects with one another may trigger alarms or notifications according to the rules specified in the policy engine.

Referring now to FIG. 1, a network 1 on which motion monitoring processes and convergence/divergence monitoring processes may be implemented now is described.

Network 1 may comprise one or more clouds, which may be public clouds, private clouds, or community clouds. Each cloud may permit the exchange of information and the provisioning of services among devices and/or applications that are connected to such clouds. Network 1 may include a wide area network, such as the Internet; a local area network, such as an intranet; a cellular network, such as a network using CDMA, GSM, 3G, 4G, LTE, or other protocols; a machine-to-machine network, such as a network using the MQTT protocol; another type of network; or some combination of the aforementioned networks. Network 1 may be a closed, private network, an open network, or some combination thereof and may facilitate wired or wireless communications of information among devices and/or applications connected thereto.

Network 1 may include a plurality of devices, which may be physical devices, virtual devices (e.g., applications running on physical devices that function similarly to one or more physical device), or some combination thereof. The devices within network 1 may include, for example, one or more of general purpose computing devices, specialized computing devices, mobile devices, wired devices, wireless devices, passive devices, routers, switches, mainframe devices, monitoring devices, infrastructure devices, other devices configured to provide information to and/or receive information from service providers and users, and software implementations of such.

For example, network 1 may include a plurality of sensors 2, which may collect sensor data and provide such data to one or more clients 5 through communication therewith. Such sensor data may include, for example, GPS position information, environmental information (e.g., temperature, humidity, pressure, wind speed), and other information. In certain implementations, sensors 2 may communicate with clients 5 using a cellular network, such as 3G or LTE, for example. In other implementations, sensors 2 may communicate with clients 5 using other communication protocols or methods, such as Wi-Fi or NFC, for example. Sensors 2 may be attached to or integrated with a plurality of different objects, such as vehicles, cargo (e.g., shipping crates, boxes), supplies, mobile devices, or other components.

In addition, network 1 may include a plurality of mobile devices 3, such as cellular phones, tablets, laptops, and other portable devices. Mobile devices 3 may be powered by a mobile operating system, such as Apple Inc.'s iOS® mobile operating system or Google Inc.'s Android® mobile operating system, for example. Mobile devices 3 also may determine their own GPS position information and provide such data to one or more clients 5 through communication therewith. Similar to sensors 2, mobile devices 3 may communicate with clients 5 using a cellular network, such as 3G or LTE, for example, or other communication protocols or methods, such as Wi-Fi or NFC, for example. Further, mobile devices 3 may include one or more applications that provide a user interface, which may display alerts, alarms, and/or notifications disclosed herein, and which may provide one or more options for addressing anomalies (e.g., notifying police, deactivating a vehicle or placing the vehicle in no-drive mode, deactivating another device, placing restrictions on one or more objects, or initiating auditing processes) identified in such alerts, alarms, and/or notifications.

Moreover, network 1 may include clients 5 and one or more client hubs 7, which may control clients 5 and/or communicate with clients 5 to receive data from sensors 2 and mobile devices 3 and to transmit data back to clients 5. Client hubs 7 may communicate with one or more broker hubs 9 to transmit data received from clients 5 and/or to receive data from broker hub 9. Communication between client hubs 7 and broker hubs 9 may be security-enhanced, for example, and may utilize MQTT protocols and one or more public or private encryption scheme. Client hubs 7 may be data agnostic.

Network 1 also may include broker hubs 9, databases 11, and data platforms 13. Broker hubs 9 may communicate with one or more databases 11 to transmit data received from client hubs 7 and/or to extract data from databases 11. Broker hubs 9 may aggregate and process (e.g. normalize) information into a format appropriate for clients 5 and/or databases 11. Databases 11 may be structured information repositories that store data received from sensors 2, mobile devices 3, and a plurality of other sources in a structured manner. Databases 11 may obtain additional data from data platforms 13, which may include rich data repositories that are often referred to as "data lakes." Broker hubs 9 and databases 11 may be data agnostic.

Further, network 1 may include one or more analyzers 15, which may be implemented by one or more systems 100 (described below). Data analyzers 15 may retrieve and analyze data stored in databases 11 and may provide databases 11 with new information based on such analyses. In particular, analyzers 15 may enforce ACRs and implement one or more processes disclosed herein or contemplated hereby, such as the motion monitoring processes and the convergence/divergence monitoring processes, for example.

Figure 2:
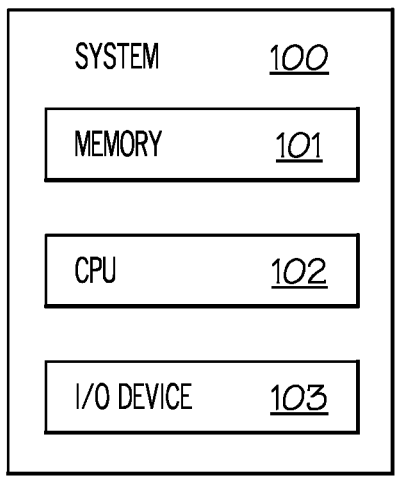
FIG. 2 is a schematic representation of a system configured to implement motion monitoring processes, convergence/divergence monitoring processes, and/or other processes.

Referring to FIG. 2, system 100 is now described. System 100 may reside on one or more networks 1. System 100 may comprise a memory 101, a central processing unit ("CPU") 102, and an input and output ("I/O") device 103. Memory 101 may store computer-readable instructions that may instruct system 100 to perform certain processes. In particular, memory 101 may store a plurality of application programs that are under development. Memory 100 also may store a plurality of scripts that include one or more testing processes for evaluation of the applications. When computer-readable instructions, such as an application program or a script, are executed by CPU 102, the computer-readable instructions stored in memory 101 may instruct CPU 102 to perform a plurality of functions. Examples of such functions are described below with respect to FIGS. 3-6. One or more of sensors 2, mobile devices 3, clients 5, client hubs 7, broker hubs 9, databases 11, data platform 13, and analyzer 15 may be implemented by system 100 or another hardware system with similar components. In some implementations, one or more of clients 5, client hubs 7, broker hubs 9, databases 11, data platform 13, and analyzer 15 may be implemented as a virtual device/component by a software application running on system 100 or another hardware system with similar components.

I/O device 103 may receive one or more of data from networks 1, data from other devices and sensors connected to system 100, and input from a user and provide such information to CPU 102. I/O device 103 may transmit data to networks 1, may transmit data to other devices connected to system 100, and may transmit information to a user (e.g., display the information, send an e-mail, make a sound). Further, I/O device 103 may implement one or more of wireless and wired communication between system 100 and other devices within or external to network 1.

Figure 3:
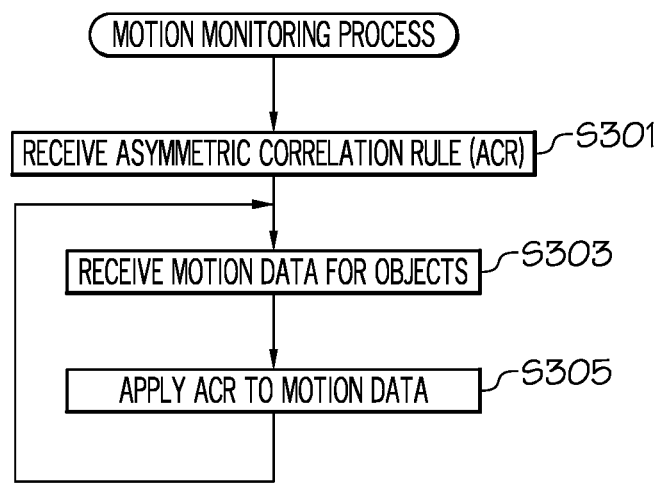
FIG. 3 illustrates a motion monitoring process.

Referring to FIG. 3, a motion monitoring process now is described. The motion monitoring process may monitor the motion (e.g., through GPS position information) of a plurality of objects (e.g., vehicles, cargo, mobile devices), apply one or more asymmetric correlation rules (ACRs) to determine whether certain objects should have correlated motion with one another and whether such objects do indeed have correlated motion, and provide notifications and/or the option to perform certain actions when certain objects should, but do not, have correlated motion. For example, the motion monitoring process may alert administrators to stolen vehicles, stolen cargo, and/or misplaced mobile devices.

In S301, system 100 may receive an ACR. For example, the ACR may be set in memory 101 via a user input, via a self-learning mechanism, such as machine learning or other data analysis techniques, or via another relevant mechanism.

An ACR may define a baseline state for a plurality of objects, such as a first object and a second object. For example, a baseline state for a vehicle may be a parked state (e.g., the vehicle has a motion vector of magnitude 0 with no direction). In contrast, a baseline state for a cellular phone may be any state of motion (e.g., stationary, moving in a motion vector). Consequently, the baseline states of the vehicle and the cellular phone (or the absence of a baseline state for the cellular phone) may be asymmetric in that the vehicle must be stopped to be in the baseline state while the cellular phone may be in its baseline state when stopped and when in motion (or because the cellular phone does not have a defined baseline state). In some implementations, a baseline state may not be defined for an object that is not restricted, such as the cellular phone that may be in any state of motion (e.g., because the cellular phone may permissibly take any state of motion, it is unnecessary to define a baseline state of motion for the cellular phone or to define rules for the cellular phone based thereupon).

The ACR may further define a required correlation for an object that deviates from the object's baseline state. For example, the ACR may indicate that the first object must have the same (or substantially the same) motion vector as the second object if the first object is not in the first object's baseline state. If the first object is not in the first object's baseline state and the first object does not have the same motion vector as the second object, for example, the ACR may require that an action be performed, such as an alert, notification, or alarm. Conversely, the ACR may permit the second object to freely move without requiring that the action be performed, regardless of whether the first object is in the baseline state. Consequently, an asymmetry exists in that the second object can freely move relative to the first object, but the first object can only deviate from the baseline state if the first object's motion vector is correlated (e.g., the same as or substantially the same as) with the second object's motion vector.

This further aspect of the ACR may be illustrated by continuing the vehicle and cellular phone example, in which the vehicle has a baseline state of being parked and the cellular phone may be in any state of motion. In particular, if the vehicle deviates from the parked state and begins moving, the ACR may require that the vehicle has the same (or substantially the same) motion vector as the cellular phone (e.g., that the vehicle and the cellular phone have correlated motion vectors). If the vehicle is not in the parked state and does not have the same motion vector as the cellular phone, the ACR may require that a monitoring system sends a notification to the vehicle's user and/or owner. In practice, the ACR may help the vehicle's user learn, for example, either that the vehicle has been stolen (e.g., the user is not in the car and the car is moving) or that the cellular phone has been misplaced or forgotten (e.g., the user is moving the car but the cellular phone is sitting on a desk in the user's office), as both of these events may trigger an alert, alarm, or notification. In some implementations, the ACR may be appropriately robust to allow for some movement in the baseline state or some deviation between the motion vector of the vehicle and the cellular phone, such as movement and/or deviation that may be caused by valet parking, for example. In such implementations, for example, permissible deviation may be allowed when the vehicle and the cellular phone remain within a particular distance from one another or when such deviations are relatively minor (e.g., low rate of speed, occur only for a short period of time).

Although certain example ACRs described above were defined using the concepts of a baseline state for an object and a required correlation between the object and another object when the object is not in the baseline state, ACRs may be defined in other ways. For example, a rule that permits a first object to move in a particular manner but permits a second object to move in the particular manner only when correlated with movement of the first object would similarly be an ACR. Numerous other ACRs may be contemplated by this disclosure.

Figure 7:
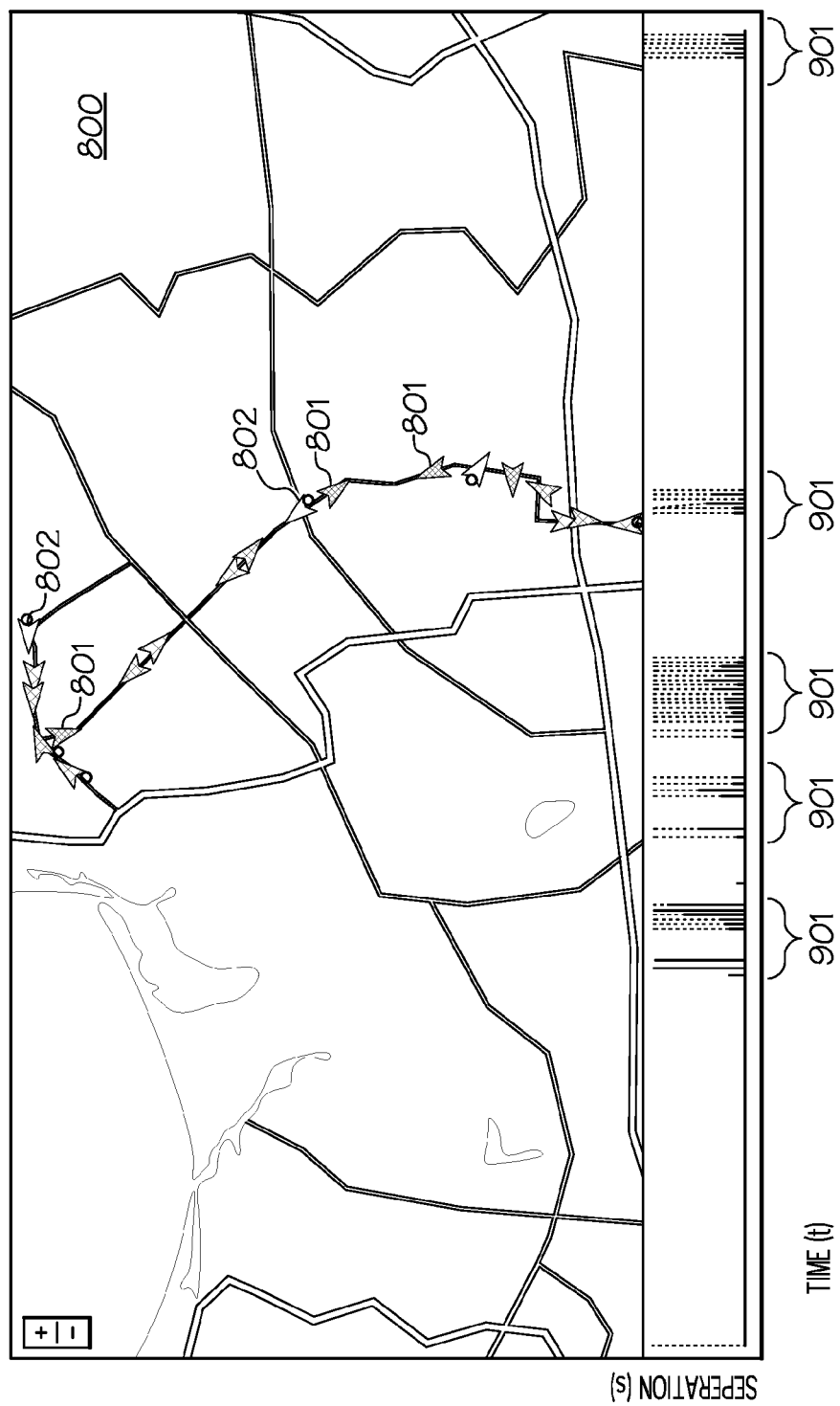
FIG. 7 illustrates an example visualization of motion vectors and other information displayed on a map.

In S303, system 100 may receive motion data for the plurality of objects. The motion data may be in the form of GPS data collected by sensors 2 and/or mobile devices 3. System 100 may use the GPS data collected over time to determine a motion vector (e.g., magnitude and direction) for each object. Over time, system 100 may determine a plurality of motion vectors for each object over a period of time to determine how each object's motion evolves in time. Example motion vectors are shown in FIGS. 7-8E (described below in more detail).

In S305, system 100 may apply one or more ACRs to the motion data (including the motion vectors derived therefrom) to determine whether one or more objects has a baseline state of motion, whether such objects are in such baseline state of motion, whether such objects are expected to move in correlation with other objects, and whether such objects are indeed moving in correlation with such other objects; to generate a notification when expected motion correlation is not occurring; and to provide an owner/administrator with options for remedial measures. The process of applying ACRs in S303 is described in more detail with respect to FIG. 4 below. After S305, the process may return to S303 and wait to receive additional motion data.

Figure 4:
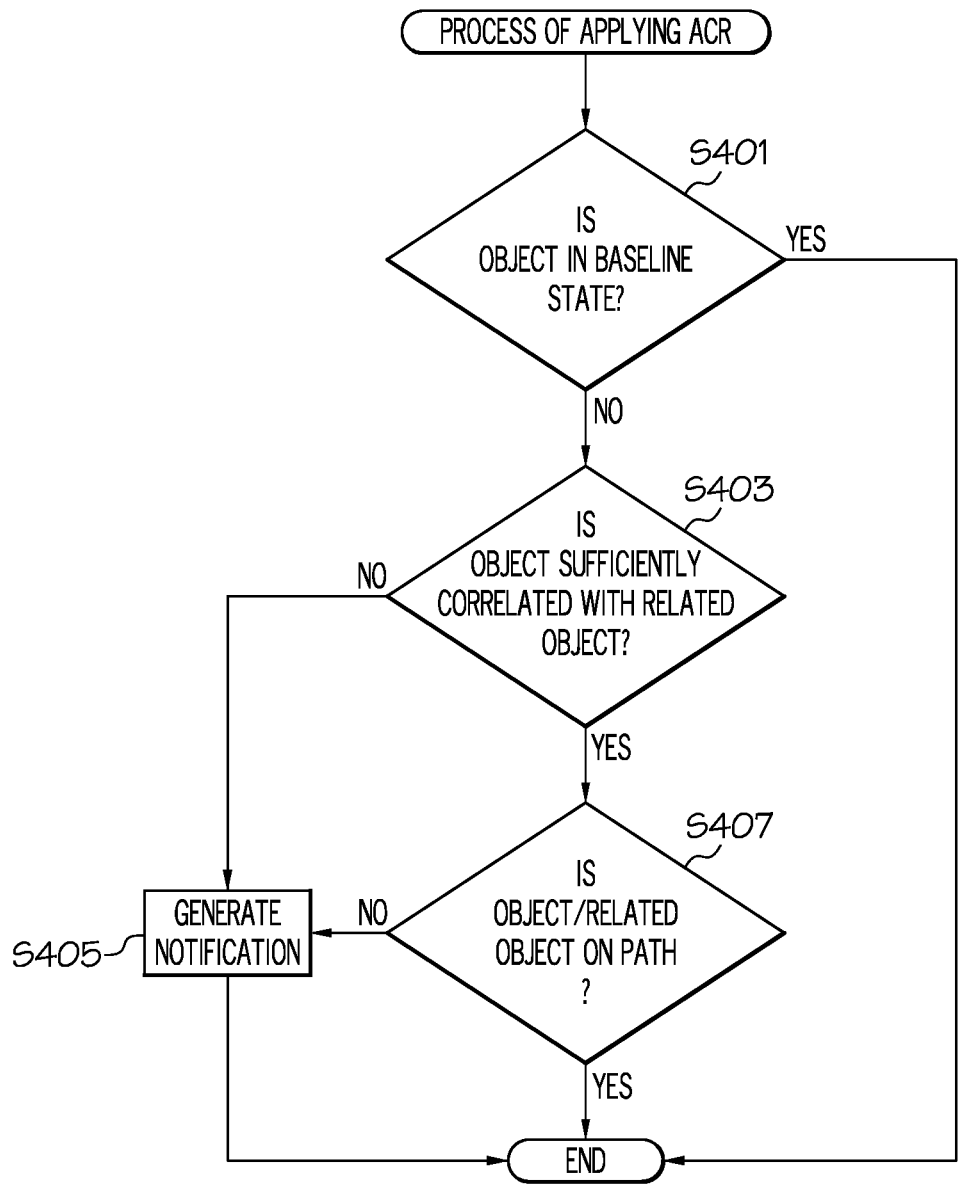
FIG. 4 illustrates a process of applying asymmetric correlation rules to motion data.

Referring to FIG. 4, a process of applying ACRs to motion data now is described. As described above, the ACRs may permit some objects to move freely but may expect certain objects to move in correlation with other objects when such objects are not in a particular state of motion. As describe above, an example of two asymmetrically correlated objects might be a vehicle and a cellular telephone. The cellular telephone may be permitted to freely move anywhere and in any motion vector relative to the vehicle. On the other hand, the vehicle may only be permitted to be in a parked state (e.g., a baseline state of motion) when the cellular telephone is not in the vehicle. Consequently, if the vehicle is moving (e.g., is not parked and, thus, has a motion vector), system 100 may check to see whether the vehicle's motion vector is sufficiently correlated with the cellular telephone's motion vector (e.g., whether the vehicle's motion vector and the cellular telephone's motion vector are correlated at some threshold level of correlation), such that system 100 may conclude that the vehicle and cellular telephone are moving together.

In S401, system 100 may use the motion data (including the determined motion vector) to determine whether an object is in a baseline state of motion defined for the object in the ACR. For example, a baseline state for a vehicle may be a parked state and a baseline state for cargo may similarly be a resting state. If the object is in the baseline state (S401: Yes), the process of applying the ACR to the object's motion data may end until additional motion data is received for the object, at which point the process of applying the ACR may be repeated again. If the object is not in the baseline state (S401: No), the process may proceed to S403. For example, if the vehicle is parked or the cargo is sitting in a warehouse, system 100 may determine that the vehicle and cargo are in their respective baseline states (S401: Yes). If the vehicle is moving or the cargo is in a moving delivery truck, system 100 may determine that the vehicle and the cargo are not in their respective baseline states (S401: No) and proceed to S403.

In S403, system 100 may compare the motion data (including the determined motion vector) of an object that is not in its baseline state with the motion data for a related object to determine whether the motion vectors of the object and the related objects are sufficiently correlated (e.g., whether the motion vectors of the object and the related object are correlated at some threshold level of correlation). In particular, the ACR may define a correlation relationship between the object and the related object that includes a sufficient level of correlation (e.g., a threshold level of correlation). For example, the ACR may indicate that a vehicle and a cellular telephone owned by the same person have a correlation relationship with one another and that a sufficient level of correlation would be that the cellular telephone and the vehicle have the same motion vector when the vehicle is moving. In some implementations, a more lenient level of correlation may be defined by the ACR to account for errors in sensor data or typical interactions, such as valet parking or loading of cargo. For example, the ACR may indicate that only a 90% correlation is required; that the direction or magnitude of motion vectors for the object may be different at lower speeds, such as those required to park a car or load cargo; or that the required level of correlation is reduced as the two objects move closer to one another (or vice versa).

If system 100 determines that the motion vector of the object is sufficiently correlated with the motion vector of the related object (S403: Yes), the process may proceed to S407. For example, if a cellular phone and a vehicle are assigned a correlation relationship by the ACR and the cellular phone is in the vehicle while the vehicle is moving, system 100 would likely determine that the cellular phone and the vehicle are sufficiently correlated (S403: Yes). Similarly, if cargo is assigned a correlation relationship with a delivery truck by the ACR and the cargo is in the delivery truck while the truck is moving, system 100 would likely determine that the motion vectors of the cargo and the truck are sufficiently correlated (S403: Yes).

If system 100 determines that the motion vector of the object is not sufficiently correlated with the motion vector of the related object (S403: No), the process may proceed to S405. For example, if a cellular phone and a vehicle are assigned a correlation relationship by the ACR and the cellular phone is not in the vehicle while the vehicle is moving, system 100 would likely determine that the cellular phone and the vehicle are not sufficiently correlated (S403: Yes). Similarly, if cargo is assigned a correlation relationship with a delivery truck by the ACR and the cargo is not in the delivery truck even though the cargo is moving, system 100 would likely determine that the motion vectors of the cargo and the truck are not sufficiently correlated (S403: Yes).

In S405, system 100 may generate a notification or other alert/alarm indicating that an anomalous event has occurred (e.g., that an expected correlation relationship has failed to occur). The notification may include details about the object and the related object, such as a map showing the locations of the objects (or even a location history of the objects) and/or the motion vectors (e.g., current motion vectors and/or history of motion vectors) of the objects. The notification may identify the objects and provide summary information about the objects, such as intended destination (e.g., for cargo being shipped, for a vehicle using routing software), estimated arrival time, speed, and other information. In some implementations, the notification may include an interface that allows the recipient to easily contact the police (e.g., for stolen items), engage a locking mechanism, place a vehicle in no-drive mode, engage a more-aggressive tracking cycle (e.g., increasing the frequency of calls for GPS data), to take other remedial measures, or to indicate that the monitored behavior is not actually anomalous. The notification may be sent to an administrator's mobile device, for example, as a text message, as an e-mail, as an app notification, as a telephone call, or by any other conceivable means. After S405, the process of applying the ACR to the object's motion data may end until additional motion data is received for the object, at which point the process of applying the ACR may be repeated again.

In S407, system 100 may compare the motion data for the object or for the correlated object with an expected path for the object or for the related object to determine whether the object and/or the correlated object are appropriately following the path. If the object or the correlated object is appropriately following the path, system 100 may determine that the object (or the correlated object) is on the path (S407: Yes), and the process of applying the ACR to the object's motion data may end until additional motion data is received for the object, at which point the process of applying the ACR may be repeated again. If the object or the correlated object is not appropriately following the path, system 100 may determine that the object (or the correlated object) is not on the path (S407: No), and the process may proceed to S405 and generate a notification indicating that the object or the correlated object is not on the expected path. A similar interface including remedial measures also may be presented. In some implementations, deviations from the specified path may be permitted, such as those required for mandatory detours or to avoid traffic congestion, for example.

For example, a delivery truck may have a specified path that the truck takes when delivering cargo to a specific location. If the delivery truck is delivering particular cargo to the specific location, it is expected that both the cargo and the delivery truck will follow the path. Consequently, the ACR may include a specified path that the delivery truck and the cargo transported by the delivery truck are expected to follow. In some cases, the ACR may also include an expected travel time or a series of expected motion vectors along the path, such that system 100 may determine an expected position for the delivery truck and the cargo along the path at various different points in time. If the delivery truck (or the cargo) deviates from the path, system 100 may determine that the object (or the correlated object) is not on the path (S407: No). In some implementations, if the delivery truck (or the cargo) is not located at a particular position along the path (or do not at least have motion vectors converging to such position) at a particular time, system 100 may similarly determine that the object (or the correlated object) is not moving appropriately on the path (S407: No). Conversely, in some configurations, if the delivery truck (or the cargo) is on the path, system 100 may determine that the object (or the correlated object) is on the path (S407: Yes). In still other implementations, system 100 may only determine that the object (or the correlated object) is on the path (S407: Yes) if the delivery truck (or the cargo) are located at a particular position along the path (or at least have motion vectors converging to such position) at a particular time.

In certain implementations, the ACR may be periodically applied as additional motion data is received for the plurality objects. Consequently, while the process of applying the ACR may determine when an object initially transitions from its baseline state and engages in correlated motion with a related object, the process of applying the ACR may also determine when objects previously in correlated motion begin to diverge. For example, cargo may fall out of a delivery truck during transport. In such a scenario, the motion vectors of the cargo and delivery truck would diverge, such that the motion vectors are no longer sufficiently correlated. Consequently, periodically applying the ACR may detect this divergence and serve as a trigger for system 100 to generate a notification indicating that the objects' motion vectors have diverged and are no longer sufficiently correlated. Such notification may be substantially similar to the notification of S405.

Figure 5:
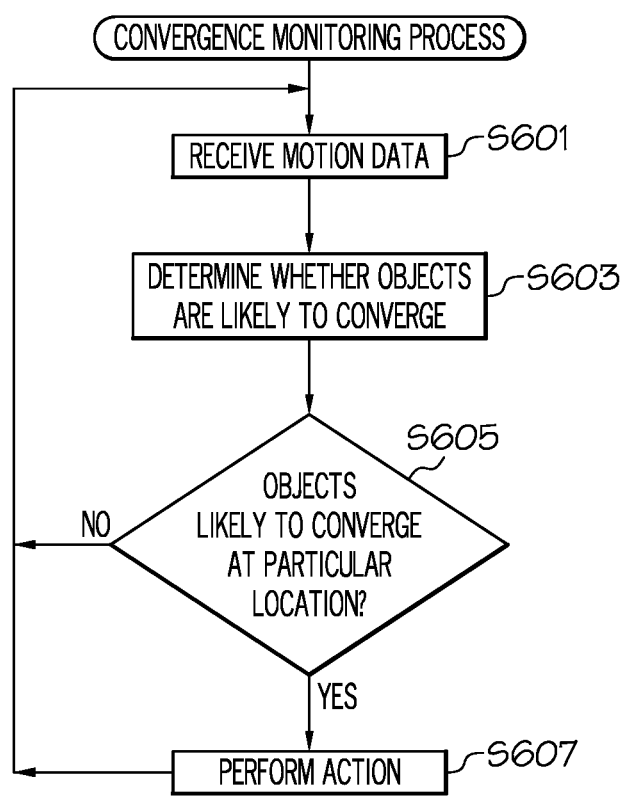
FIG. 5 illustrates a convergence monitoring process.

Referring to FIG. 5, convergence monitoring process now is described. The process of convergence monitoring may be used to determine when a plurality of objects are expected to converge at a particular location at the same time. This process may enable more efficient utilization of resources, for example. In particular, one example may involve deliveries to a factory. For example, sensors 2 may be attached to cargo containing supplies for use in an automobile manufacturing facility. The automobile manufacturing facility may use motion data to determine motion vectors for the cargo and, ultimately, to predict expected arrival times for the cargo at the automobile manufacturing facility.

The automobile manufacturing facility may normally only receive small shipments at steady intervals and may typically use a small number of workers and/or machines to receive deliveries. Thus, the automobile manufacturing facility may not normally be equipped to handle large deliveries or simultaneous deliveries from multiple suppliers and would not be able to handle such deliveries without bringing in additional workers and/or machines and/or repurposing existing workers and/or machines, which may take a substantial amount of time. Consequently, the process of unloading large or simultaneous deliveries may be inefficient in a business where "time is money."

If the automobile manufacturing facility determines, using the monitoring techniques disclosed herein, that a large amount of cargo will be arriving simultaneously, the automobile manufacturing facility may request additional workers and/or machines and/or reallocate workers and/or machines from other tasks prior to the arrival of such cargo, so that the automobile manufacturing facility is immediately ready to unload the cargo and incorporate such cargo into the assembly lines quickly and efficiently. Consequently, the methods disclosed herein may lead to improved efficiency and other benefits.

In S601, system 100 may receive motion data for a plurality of objects. The motion data may be in the form of GPS data collected by sensors 2 and/or mobile devices 3. System 100 may use the GPS data collected over time to determine a motion vector (e.g., magnitude and direction) for each object. Over time, system 100 may determine a plurality of motion vectors for each object over a period of time to determine how each object's motion evolves in time. Consequently, S601 may be substantially similar to S303 described above.

In S603, system 100 may use the motion vectors determined in S601 to determine whether a plurality of the monitored objects are expected to converge at a specific location at a particular time (e.g., the same time, within a particular period of time, before a certain time, after a certain time). In particular, system 100 may utilize the motion vectors for each object (and/or a history of motion data for each object) to determine whether the objects are traveling to the specific location and to predict an arrival time at the specific location for objects traveling to that location. Returning to the example above, such objects may be cargo or delivery vehicles and the specific location may be a factory.

If system 100 determines that a plurality of objects are likely to converge at the specific location at the particular time (S605: Yes), the process may proceed to S607. If system 100 determines that a plurality of objects are not likely to converge at the specific location at the particular time (S605: No), the process may return to S601 and wait to receive additional motion data.

In S607, system 100 may perform an action in response to determining that a plurality of objects are likely to converge at the specific location at the particular time. The action may include generating a notification indicating the expected arrival of the objects and providing identification of the objects. For example, in the cargo/delivery truck/ factory example, the notification may include an expected arrival time and a cargo manifest for each delivery truck. The factory may then use this information to start preparing for the arrival and to efficiently time preparatory measures, so that workers and/or machines are not reallocated prematurely or too late. In some implementations, the action may include one or more automated processes. In the cargo/ delivery truck/factory example, an automated process might be opening doors or gates a few moments prior to the expected arrival, temporarily shutting down one or more assembly lines, turning on heaters/air conditioners near loading docks to keep the workers and/or the factory environment comfortable, and positioning loading/unloading robots to receive the delivery, for example. In other implementations, the action may involve manual processes or some combination of manual and automated processes. After S607, the process may return to S601 and wait to receive additional motion data.

Figure 6:
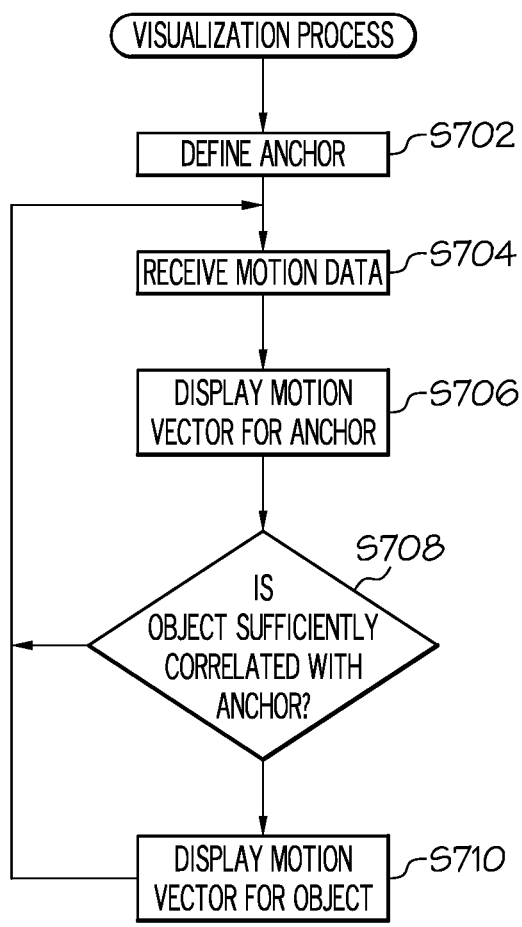
FIG. 6 illustrates a visualization process.

FIG. 6 illustrates a visualization process. The visualization process may permit users and/or administrators to visualize the motion of a plurality of objects in a clean and efficient manner. In particular, the visualization process may utilize an anchor object to represent a plurality of objects with similar motion characteristics. For example, the motion vectors of the anchor object at a plurality of points in time may be displayed on a map. Each motion vector for the anchor object may be displayed along the path taken by the cellular telephone at a position representing the position (or a combination of positions) where the motion data was collected.

For example, a motion vector may be determined from two points of GPS data and the time at which each of these two points was determined (e.g., when the position of the cellular telephone was "pinged"). The motion vector determined from these two points and times may be displayed on the map at the GPS coordinates for the first point, the GPS coordinates for the second point, or at some set of intermediate coordinates determined from the GPS coordinates at the first point and the second point (e.g., an average position, a weighted average position).

While the motion vectors for the anchor object may be displayed, the corresponding motion vectors for objects with similar motion characteristics may be hidden, suppressed, or otherwise not represented on the map. For example, when the motion vectors of a first object and a second object are sufficiently correlated (e.g., in a manner similar to that determined in S403), the motion vectors of the first and second object may be similar and basically overlap, thus cluttering the map if both displayed. Consequently, the visualization process of FIG. 6 may avoid such clutter by displaying only the motion vector for the anchor object when the motion vectors of the first and second objects are sufficiently correlated.

In certain implementations, a distance threshold between the first and second objects, rather than motion vector correlations, may be used to determine whether only the anchor object's motion vector should be displayed or whether both the anchor object's motion vector and other object's motion vectors should be displayed. Such implementations may be effective at reducing even more clutter in the map, as objects in close proximity to one another (in the real world) may have representations that readily overlap one another on the map when such representations are all displayed. Such distance thresholds may be based on average distances between the objects, standard deviations, and other parameters.

As an example, a cellular telephone may be defined as the anchor object, and a sensor 2 may periodically provide the GPS position of the cellular telephone. The cellular telephone may be inside a car that also includes a sensor 2 that periodically provides the GPS position of the car. As the car drives along the road, system 100 may determine a plurality of motion vectors for the cellular telephone. System 100 also may periodically use the GPS positions of the cellular telephone and the car to determine that the cellular telephone is within a particular distance threshold (e.g., 5 feet, 10 feet) of the car. Consequently, system 100 may display the motion vectors for the cellular telephone on the map, but may omit displaying the motion vectors for the car. After the car parks, the cellular telephone may leave the car as the phone's user walks away. Once the distance between the cellular phone and the car exceeds the distance threshold, system 100 may begin displaying both the motion vector for the cellular telephone and the motion vector for the car (e.g., since the car is parked, it would be a null vector in this scenario) on the map simultaneously. Consequently, if the car later starts moving without the phone (e.g., the car is stolen), the owner may observe the path and motion vectors of the car on the map. In some configurations, the distance threshold may be set high enough so that an activity, such as valet parking, for example, is not displayed on the map.

A more detailed description of the visualization process now is described. In S702, system 100 may define an object as an anchor object. Any monitored object may be defined as the anchor object. In the example above, a cellular phone was defined as the anchor object, but the car could have alternatively been defined as the anchor object, for example.

In S704, system 100 may receive motion data corresponding to each of the monitored objects. The motion data may be time-stamped GPS position data, for example.

After enough motion data has been collected, system 100 may use the motion data to determine motion vectors for each of the objects being monitored, including the anchor object. In S706, system 100 may generate a representation of the motion vector for the anchor object and display the representation at a point along the anchor object's path (e.g., at a point corresponding to or derived from one or more of the GPS coordinates used to determine the motion vector).

In S708, system 100 may determine whether another object is sufficiently correlated with the anchor object. For example, system 100 may determine whether the other object is sufficiently correlated with the anchor object by determining whether the anchor object and the other object is within a particular distance threshold of one another. Alternatively, system 100 may determine whether the other object is sufficiently correlated with the anchor object by determining whether the respective motion vectors of the anchor object and the other object is within a threshold level of correlation with one another. If system 100 determines that the other object is sufficiently correlated with the anchor object (S708: Yes), the process may return to S704, without displaying the motion vector for the other object for that point along the path, and wait to receive additional motion data. If system 100 determines that the other object is not sufficiently correlated with the anchor object (S708: No), the process may proceed to S710.

In S710, system 100 may generate a representation of the motion vector for the other object and display the representation at a point along the other object's path (e.g., at a point corresponding to or derived from one or more of the GPS coordinates used to determine the motion vector). In some implementations, such as those described below with respect to FIGS. 7-8E, a representation of the motion vectors of such other objects may not be generated or displayed, and a representation of such other objects' position may instead be generated and displayed in S710. In any event, after S710 the process may return to S704 and wait to receive additional motion data.

Referring to FIG. 7, an example visualization of motion vectors and other information displayed on a map now is described. In particular, FIG. 7 shows a map 800, which may represent a geographic region in which a plurality of monitored objects have been moved within some period of time. Although the visualization of FIG. 7 may represent the motion of a plurality of objects, the visualization may only show the motion vectors 801 for the anchor object in order to reduce clutter and to make the map easier to understand. In particular, FIG. 7 shows motion vectors 801 with a changing level of darkness, which may reflect the age of the data used to determine the motion vector. For example, darker motion vectors 801 may be determined from more-recent GPS data, and lighter motion vectors 801 may be determined from older GPS data. In some implementations, variations in shading or color may be used to denote age rather than lightness/darkness. Consequently, motion vectors based on data may slowly fade away as the data ages and may disappear entirely (e.g., may not be depicts) for data older than a certain threshold age.

Where other objects are sufficiently correlated with the anchor object, representations for such other objects may not be generated and displayed on map 800. Nevertheless, where such other objects are no longer sufficiently correlated with the anchor object, system 100 may generate representations for such other objects and may display such representations on map 800. Specifically, FIG. 7 shows points 802, which represent the positions of objects that were no longer correlated with the anchor object at various points in time. While points 802 shown in FIG. 7 represent the positions of such objects, other implementations (not shown) may further show representations of the motion vectors of such objects that have decoupled from the anchor object. In some implementations, each point 802 may represent a plurality of other objects that were not sufficiently correlated with the anchor object, but that may be substantially correlated with one another. In other implementations, each point 802 may represent an average position for a plurality of other objects that were not sufficiently correlated with the anchor object As noted above, a variety of criteria may be used to determine whether an object is sufficiently correlated with the anchor object. For example, in some implementations, a threshold level of correlation between the motion vector (e.g., direction and/or magnitude) of the anchor object and the other object may be used as criteria to determine whether the anchor object and the other object are sufficiently correlated. In other implementations, such as those shown in FIG. 7, a separation criteria may be used to determine whether the anchor object and the other object are sufficiently correlated. Such separation criteria may define an absolute distance threshold, such that system 100 may determine that other objects that are further away from the anchor object than the threshold distance are not sufficiently correlated with the anchor object and that other objects that are within the distance threshold from the anchor object are sufficiently correlated with the anchor object. In some implementations, the separation may be based on an average (over time) amount of separation from the anchor object or based on a value derived using standard deviations.

FIG. 7 also shows a histogram of the separation (s) between an object and the anchor object at a plurality of different times (t). The shaded portions of the histogram represent outliers 901, where the separation threshold has been crossed and system 100 has determined that the object is not sufficiently correlated with the anchor object. In other words, outliers 901 represent points in time (or points along the path travelled by the anchor object) where one or more points 802 representing the other object may be generated and displayed on map 800 in addition one or more motion vectors 801.

Figure 8A:
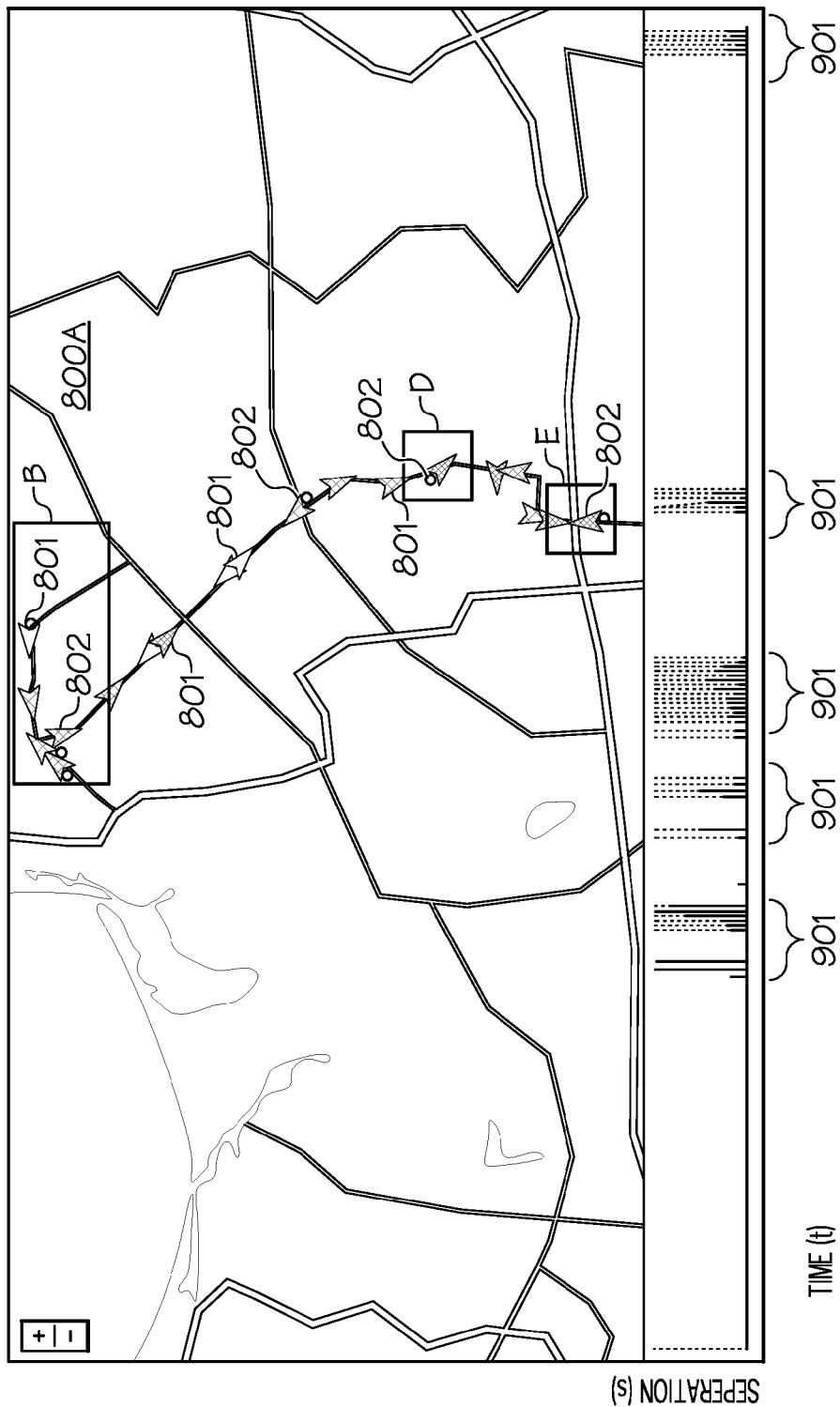
FIG. 8A illustrates the example visualization of FIG. 7 including identification of several zoom-in regions.

FIG. 8A illustrates the example visualization of FIG. 7 including identification of several zoom-in regions. Specifically, FIG. 8A shows substantially the same map (map 800A), set of motion vectors 801, and points 802 as FIG. 7. Nevertheless, FIG. 8A identifies zoom-in regions B, D, and E, which correspond to zoomed-in visualizations shown in shown in FIGS. 8B, 8D, and 8E.

Figure 8B:
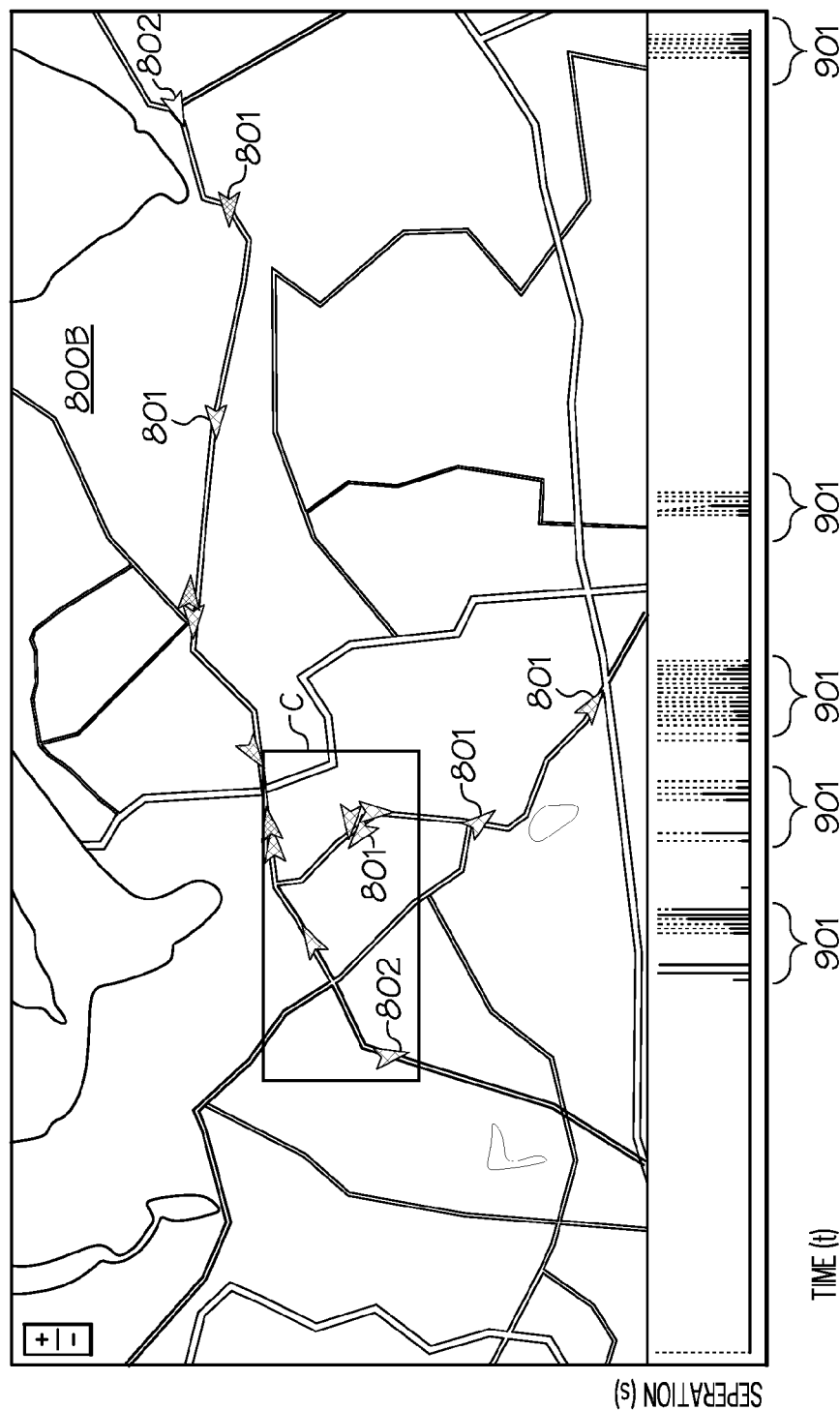
FIG. 8B illustrates a zoomed-in view of one of the zoom-in regions identified in FIG. 8A.

FIG. 8B illustrates a zoomed-in view of region B identified in FIG. 8A. FIG. 8B shows map 800B, motion vectors 801, and points 802. Nevertheless, because FIG. 8B is zoomed-in further, system 100 may generate and display additional motion vectors 801 and points 802. For example, such additional motion vectors 801 and points 802 may be motion vectors 801 and points 802 that were previously omitted to avoid clutter. In some implementations, the motion vectors 801 and points 802 shown in the zoomed-in region may be motion vectors 801 and points 802 that are determined using finer (e.g., shorter time periods) intervals. In certain implementations, the criteria used to determine whether the anchor object and the other object are sufficiently correlated may be dependent on the level of zooming in the map (e.g., the more zoomed-in on the map, the smaller the separation criteria, and the more likely the anchor object and another object will no longer be correlated), such that ma greater number of objects may not be sufficiently correlated (e.g., at that zoom-in level) and more points 802 may be generated in displayed. In still other implementations, points 802 that may have represented a plurality of other objects that were not sufficiently correlated in the zoom-in level of FIG. 8A may be broken down into two or more points 802 in the zoom-in level of FIG. 8B. FIG. 8B also identifies zoom-in region C, which correspond to the zoomed-in visualization shown in shown in FIG. 8C.

Figure 8C:
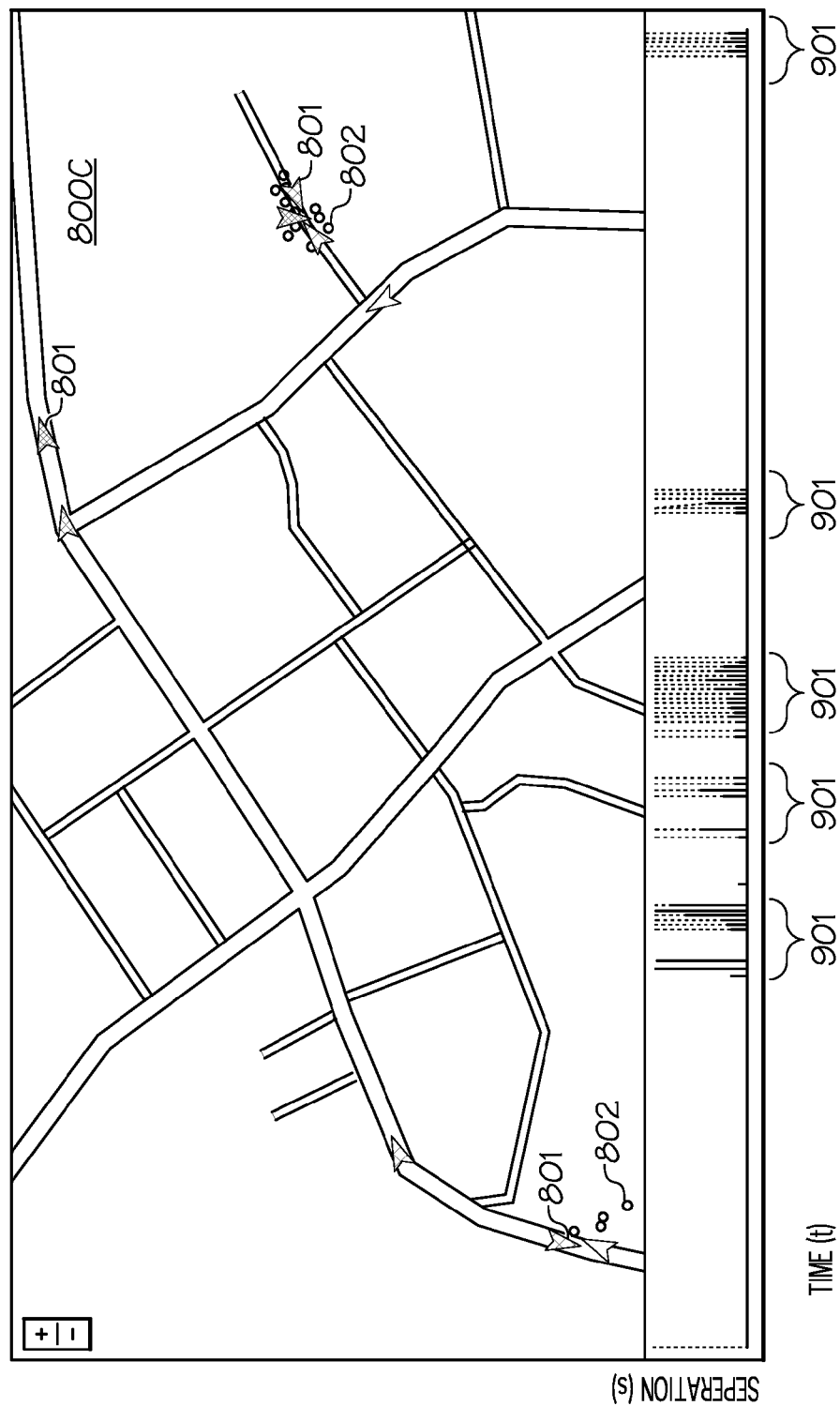
FIG. 8C illustrates a further zoomed-in view of a further zoom-in region identified in FIG. 8B.

FIG. 8C illustrates a further zoomed-in view of zoom-in region C identified in FIG. 8B. FIG. 8C may be substantially similar to FIG. 8B, except that FIG. 8C is further zoomed in and may include motion vectors 801 and points 802 representing finer intervals in time. FIG. 8C includes zoomed-in map 800C.

Figure 8D:
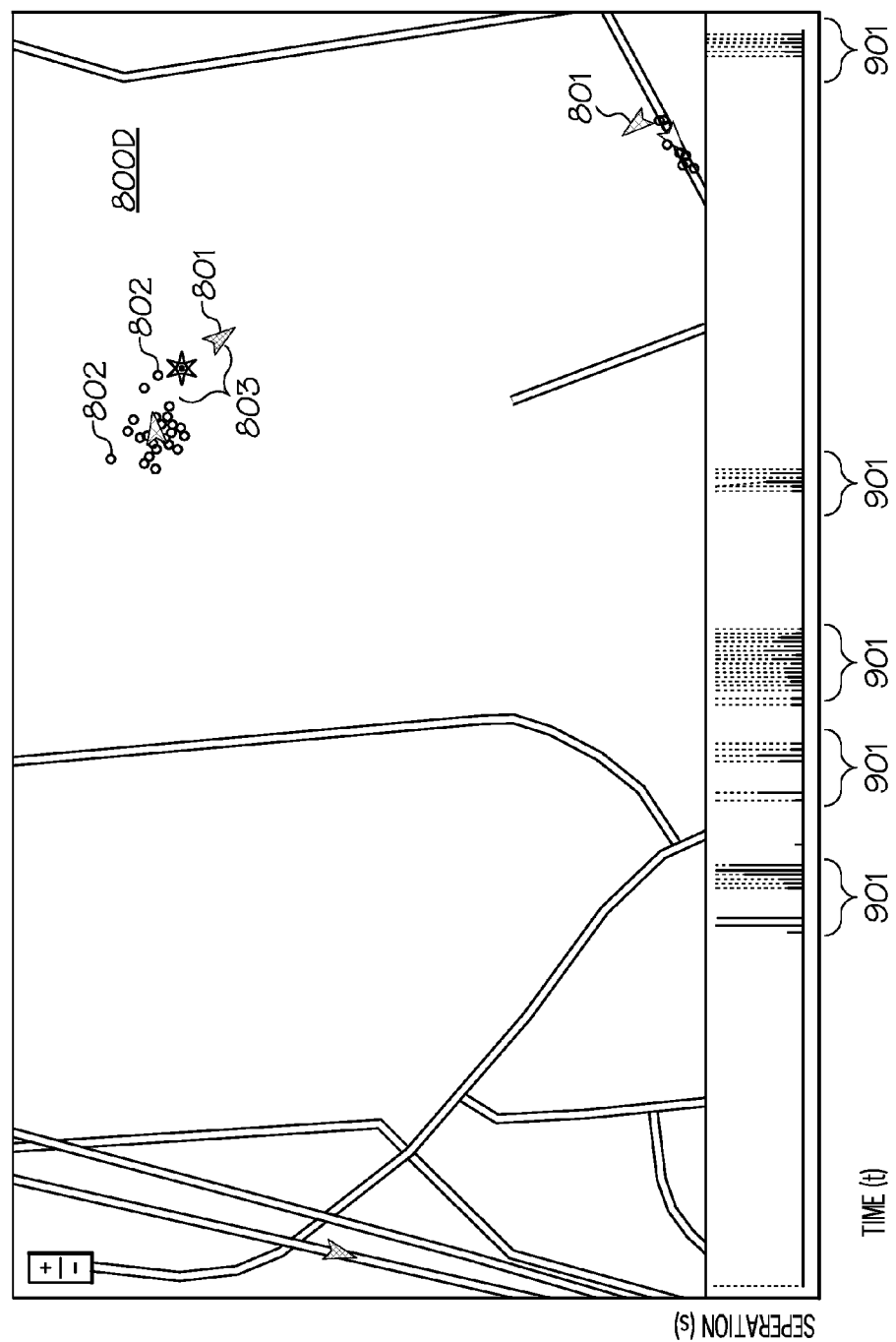
FIG. 8D illustrates a zoomed-in view of another one of the zoom-in regions identified in FIG. 8A.
Figure 8E:
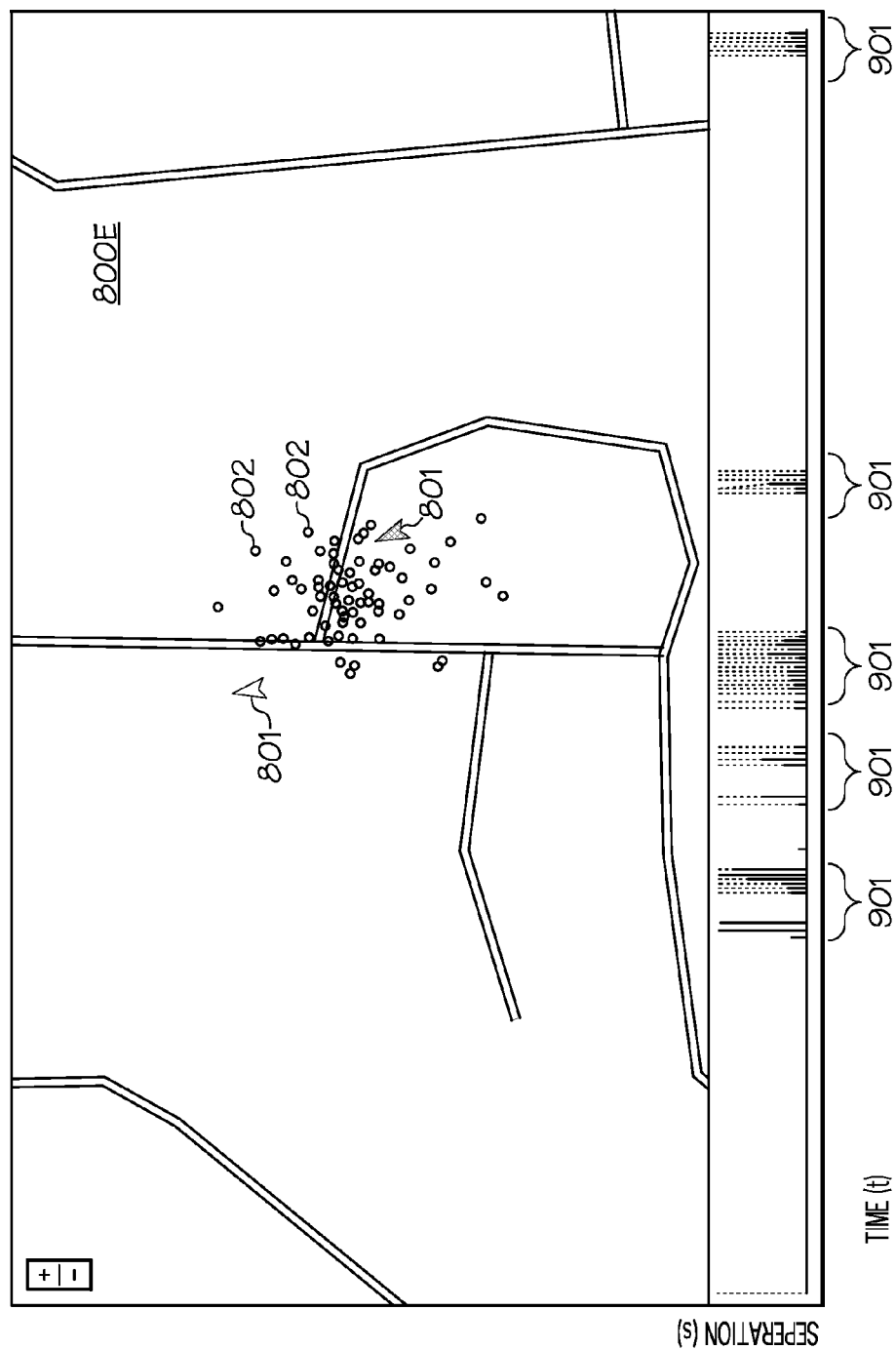
FIG. 8E illustrates still another a zoomed-in view of one of the zoom-in regions identified in FIG. 8A.

FIG. 8D illustrates a zoomed-in view of zoom-in region D identified in FIG. 8A. FIG. 8D may be substantially similar to FIG. 8B, except that FIG. 8D is zoomed in on another region. FIG. 8D includes zoomed-in map 800D. Moreover, because additional motion vectors 801 are shown in FIG. 8D, anomalies, such as anomaly 803 may be readily observable. Specifically, the star-like pattern representing anomaly 803 is caused by a plurality of changes in the anchor object's direction in a short period of time. Consequently, the motion vectors form the star-like pattern represented by anomaly 803. Such changes in the motion vector of the anchor object within a short period of time often indicate a transition in the motion state of the anchor object. For example, the anchor object may be inside (or may itself be) a car being parked, and the changes in the direction of the motion vector may represent parking in a parking garage or hunting for a parking space on a city block. The appearance of an anomaly 803 in the visualization of the monitored objects, for example, may be used as criteria to make one or more of the determinations described herein, such as the determination in S401.

FIG. 8E a zoomed-in view of zoom-in region E identified in FIG. 8A. FIG. 8E may be substantially similar to FIG. 8B, except that FIG. 8E is zoomed in on another region. FIG. 8E includes zoomed-in map 800E.

Figure 9:
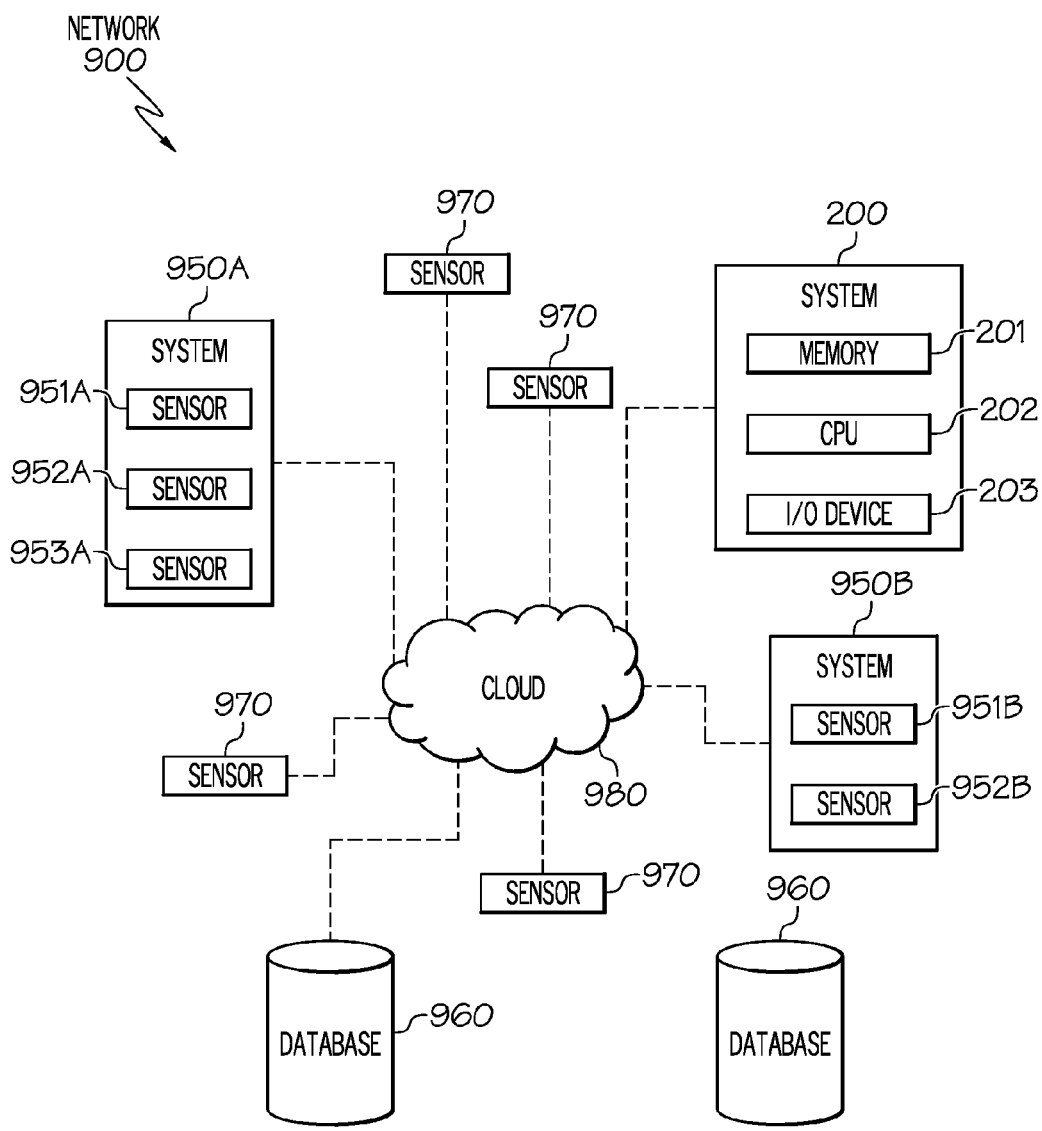
FIG. 9 is a schematic representation of a cloud environment for establishing convergence points.

With reference to FIG. 9, a high level diagram of a system 900 for determining convergence points and determining time to convergence and establishing remediation in the coordinated motion of objects. System 900 includes sensors 970 corresponding to various sensors that may or may not be associated with a vehicle. For example, stand-alone sensors 970 include a mobile device, such as a cell-phone, with numerous sensors embedded, such as GPS sensor, accelerometer, compass, and the like. The mobile device may correspond to a user, such as an operator of a vehicle, or an officer assigned to a particular mission. The general whereabouts of a larger object, such as the associated vehicle can be estimated based on the positioning and other factors determinable with reference to a motion vector or other location information from stand-alone sensors 970. Sensors 951A-953A correspond to sensors onboard a system 950A. Again, as an example, system 950A may represent a mobile device. Alternatively system 950A may correspond to an automobile with sensors on-board. For example, certain vehicles may include thousands of sensors configured to report to one or more on-board or remote computers via satellite or other communication network. System 200 includes memory 201, CPU 202 and I/O (input/output) device 203. In certain embodiments, system 200 is configured within a vehicle and communicates local sensor 970 information from one or more sensors 970 to cloud 980 to an information aggregation service is present. For example, in conjunction with database 960, system 900, via one or more central servers (not shown) aggregates sensor data to provide route guidance for ongoing missions, projects, convoys, and the like. For example, multiple automobiles assigned to a particular mission are tracked via system 900. System 900 provides convergence points, estimated time of arrivals, vehicle and route status analysis, convergence remediation, probability analysis, and other data processing tasks via one or more distributed or centralized servers. In certain embodiments, instructions, probability estimates, and convergence points are transmitted to one or more systems 200 for use in coordinating or locating vehicles.

Figure 10:
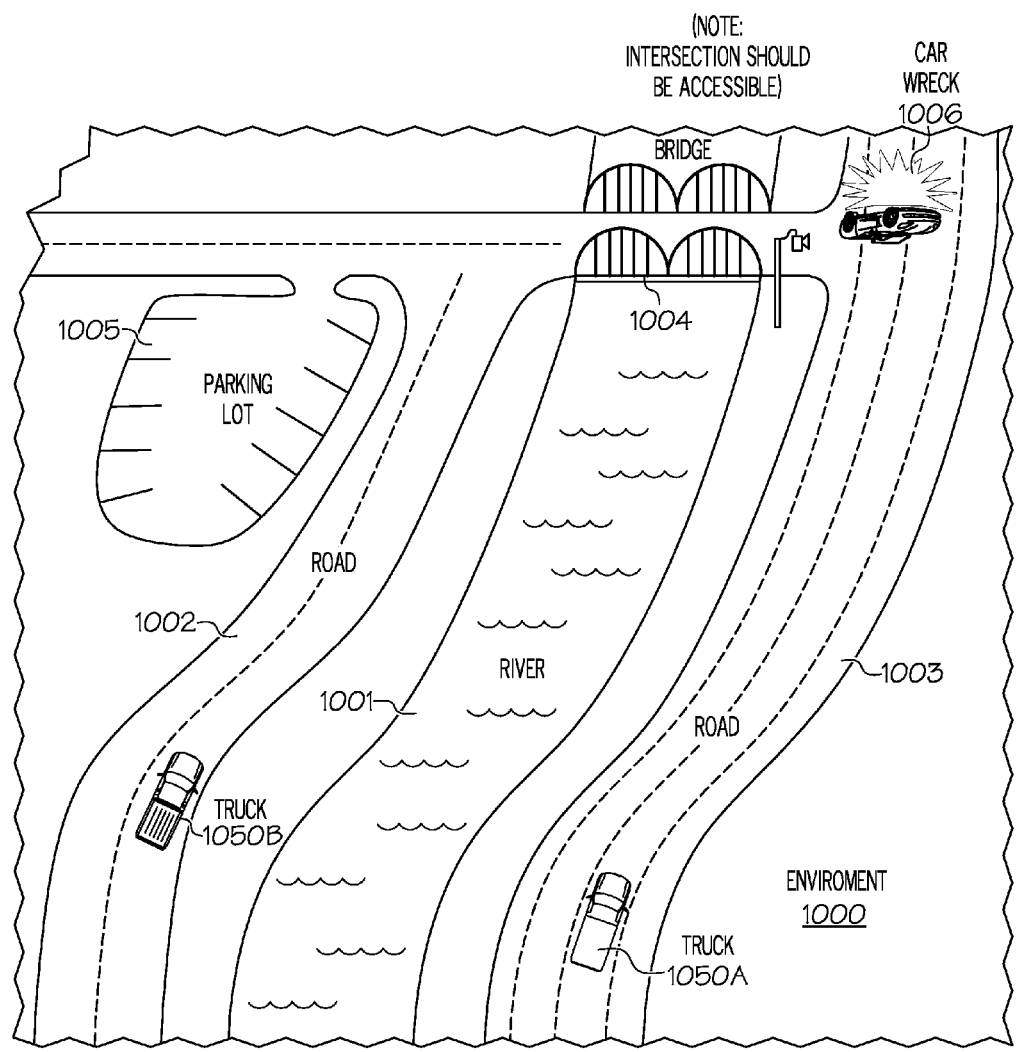
FIG. 10 illustrates an example scenario for application of a convergence point and time to convergence processes.

With reference to FIG. 10, an example map for use in illustrating an example scenario in accordance with the systems for establishing convergence points and determining time to convergence and remediation in the coordinated motion of objects in the present disclosure. FIG. 10 includes trucks 1050A and B, and car wreck 1006. In one example, emergency vehicles may be called to respond to car wreck 1006. Trucks 1050A and B are both called to respond to car wreck 1006. However, each vehicle may originate from different starting points. Certain emergency vehicles may be in high demand and may travel from emergency to emergency. For example, truck 1050A may be positioned at a first accident scene (not pictured) and summoned to respond to car wreck 1006 directly from the first accident scene. In certain embodiments, emergency vehicles in high demand may benefit from any additional time they are permitted to stay at another site. For example, in this scenario, truck 1050A is a paramedic that is responding to an emergency situation where many passengers are critically injured. In certain embodiments, truck 1050B may be a fire truck that is capable of providing at least some medical treatment for minor cuts, bruises and the like until truck 1050A is available to provide a more thorough medical examination of each passenger in car wreck 1006. For example, one of the passengers of car wreck 1006 may indicate that the accident is a fender bender and that no one has been seriously injured.

In this example, the system may provide estimated convergence times for each truck 1050A and B. For example, the convergence point is determined to be car wreck 1006. In certain embodiments, trucks 1050A and B transmit position, capability, and environment data to a central server via the above-described sensors, systems, and networks. The system determines routes for each truck to arrive at the convergence point and determines an estimated time to convergence of each truck. In certain embodiments, the system analyzes capability data of truck 1050A which transmits a signal that it is busy servicing another more urgent accident. In this example, the system may diminish the probability that truck 1050A will stop at the car wreck 1006. Accordingly, the system may notify truck 1050B before it leaves to bring additional manpower and equipment to service all passengers in car wreck 1006. As another example, if environment data for road 1003 indicates high traffic activity, the probability of truck 1050A arriving at car wreck 1006 at a certain time is diminished accordingly. Such a system may provide advance notice to emergency vehicles of the number of other vehicles that will be at a crash site to service wreck 1006. As yet another example, if the probability of truck 1050A reaching car wreck 1006 in particular amount of time is below a certain threshold, truck 1050A may be instructed not to come at all to car wreck 1006 so that it can better service the emergency it is currently servicing.

Figure 11A:
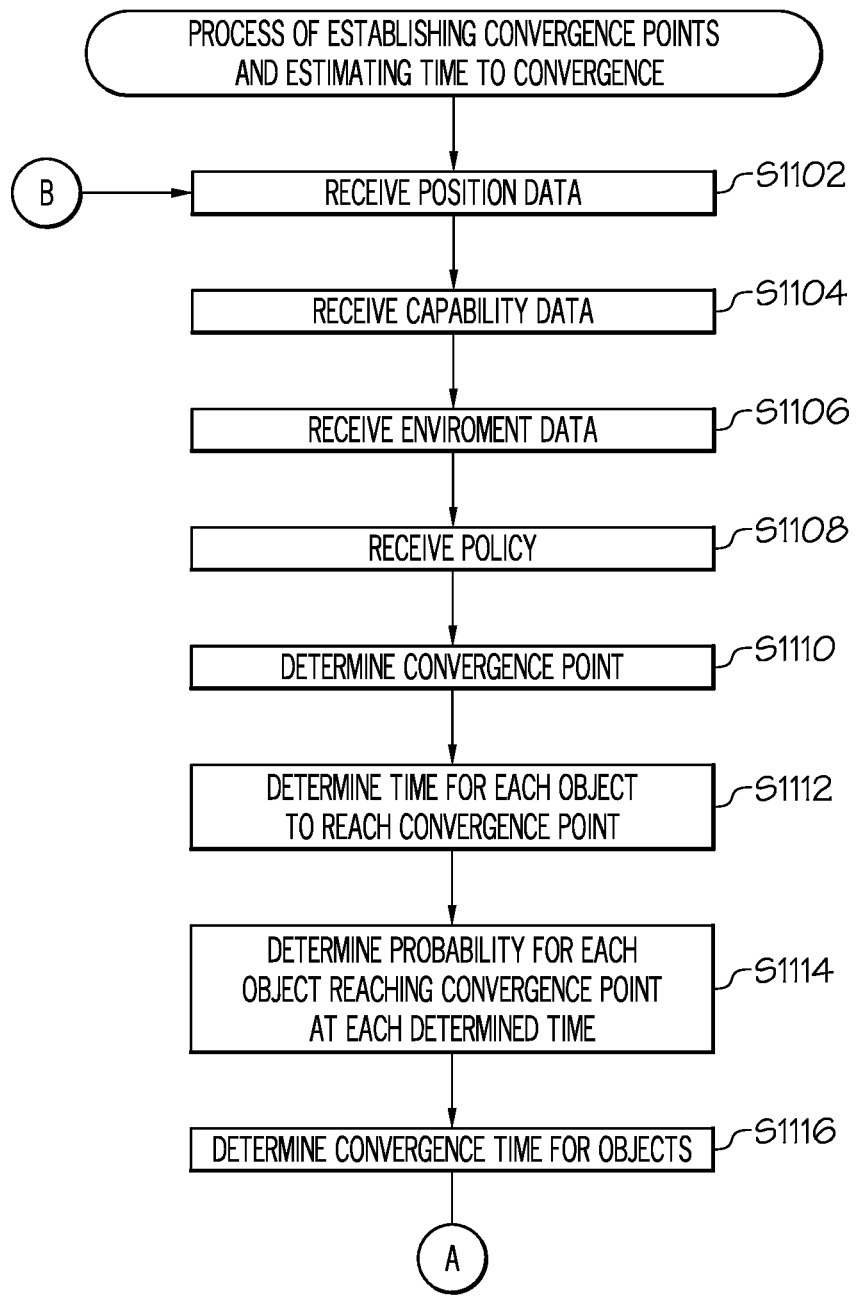
FIGS. 11A-B, 12, and 13 are flow charts implementing various example embodiments of a convergence point and time to convergence process.

With reference to FIG. 11A, a flow-chart for a method of establishing convergence points and time to convergence of objects in motion is shown. At step S1102-6, position, capability, and environment data is received from sensors embedded or in communication with various objects. For example, a vehicle has an embedded computer that gauges various systems operating in the vehicle, such as engine, drive train, fuel level, tire pressure, and other systems. Location data is also gathered. For example, velocity, acceleration, altitude, and other location information is gathered from various sensors. Terrain information is also received as environment data. For example, a computer or central server can request terrain data from a third party mapping application. As another example, traffic or roadblock information can be gathered from a third party system. Other data can be received, such as data regarding current and or previous assignments, objectives, and the like from one or more vehicles.

At step S1108, a policy is received. In certain embodiments, the policy specifies a relative priority between converging with another object or arriving at a destination point. For example, one a priority for a first vehicle can specify that the vehicle is to get to the destination point as quickly as possible. In certain embodiments, the vehicle may be carrying a protected payload. Converging with another vehicle may be less important than delivering the payload to the destination. In certain embodiments, converging with another vehicle may be prioritized over reaching the destination. For example, if the payload is extremely valuable, travel without the other vehicles in the convoy can be dangerous. Accordingly, convergence with another vehicle is prioritized.

In certain embodiments, the policy specifies a limitation on types of paths on which the first object is permitted to travel. For example, certain paths can be classified as dangerous for being susceptible for ambush or other attacks. Certain paths may be good candidates for traffic accumulation. These paths may be de-prioritized with respect to other available routes. For example, the policy may specify that these paths are to be used only in extreme emergencies or when no other routes are available. In certain embodiments, the policy contains a specification as to whether or not each object is permitted to wait for the other object at the convergence point. For example, certain objects carrying a sensitive or protected payload may be considered vulnerable if they're left stationary for a certain amount of time. Those objects may not be permitted to remain at a convergence point for any or a prolonged period of time. In certain embodiments, the policy describes the type of travel permitted for each object. In certain embodiments, upper and lower limits for travel time are established for each object. For example, if the travel time required to converge with another object is exceeded, the object may not be permitted to converge with the other object and instead may be directed to the destination. The policies described in accordance with the various embodiments presented above may be applied to one, two, three, or any number of objects of the presently described systems. In certain embodiments, the policies are applied to each object individually, exclusive of the other. For example, if one object is indicated as a higher priority than other objects, special policies are applied for that particular object.

In certain embodiments, general rules are also specified in the policy data. For example, rules can specify a tolerance or threshold for allowing location data for objects to diverge or veer off course from a particular predetermined path. The policy may specify a permissible amount of deviation by objects from a current path to the destination, or a permissible amount of deviation from other objects traveling in the convoy. This allowable deviation may be referred to as a cluster tolerance, correlation threshold, or the like.

Figure 11B:
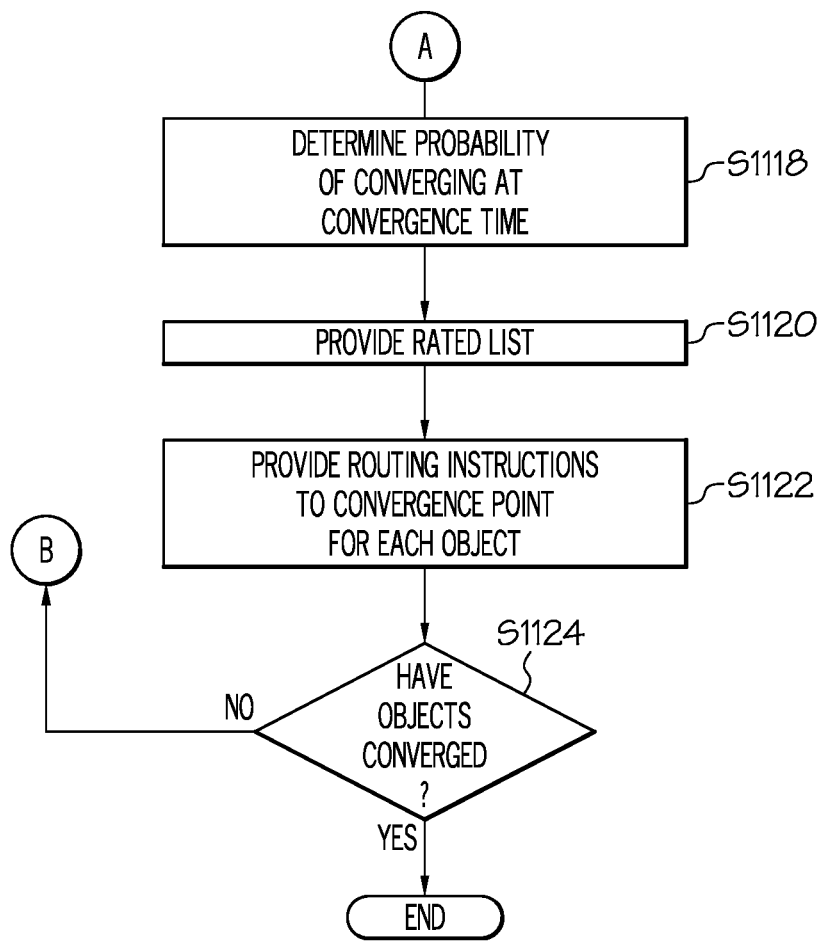

With reference to FIG. 11B, another flow-chart for a method of establishing convergence points and time to convergence of objects in motion is shown. At step S1118, a probability of converging at the convergence time is determined. In certain embodiments, the system determined independent probabilities that each object will arrive at the convergence point at or before the determined convergence time. Such an analysis may consider traffic information, terrain data (i.e., whether known impediments such as rocks, mountains, rivers, or other natural and unnatural obstructions lie in the specified path), and other environmental factors that may affect the timeliness or probability of arriving at the specified convergence point. In certain embodiments, the analysis considers the likelihood of the object veering off course to take another path, or being delayed by other factors. For example, in the emergency response example above, another more serious accident may occur that requires attention of one of the trucks (objects) before the truck arrives at the crash scene. Such an accident would cause the truck to veer off the path leading to the convergence point to attend to the needs of the other crash victims. Since crashes are unpredictable and likely at almost any time of the day, the probability of another event that causes one or more of the accidents to veer off course is also included in the probability analysis.

In certain embodiments, each route/convergence time/convergence point combination is rated by the probability indicators. This information may be incorporated into a table, such as the tables described below with reference to FIGS. 14A-C and described in more detail below. The tables can be provided to one or more objects or systems that can use the information to predict object motion and make intuitive inferences based on the anticipated positions of each object. For example, during a reconnaissance mission, the probability of a first team arriving at a convergence point at each time is determined and a rescue convoy can be sent to the convergence point at the most likely time for arrival of the team in order to minimize wait time at the convergence point for the rescue convoy and thus minimize exposure of the rescue team.

At step S1122, routing instructions are forwarded to each object. In certain embodiments, a most likely or best possible convergence time and location are determined with reference to the above described analysis. The suggested routes are forwarded to each object for use in traversing the terrain to arrive at the convergence point to optimize policy-based goals, such as those described in the above-described policy file. At step S1124, a determination is made as to whether the objects have converged. For example, such a determination can be made with reference to the on-board sensors for location or position monitoring. In certain embodiments, a manual input notifies the system that the objects have successfully converged. In certain embodiments, additional systems are engaged to provide further instructions for arriving at a destination point. For example, once the objects converge, the terrain the group is capable of traversing may be limited by the weakest or least equipped member. Accordingly, route guidance must take into account the strengths and weaknesses or "capabilities" of each object in the converged group or convoy.

Figure 12:
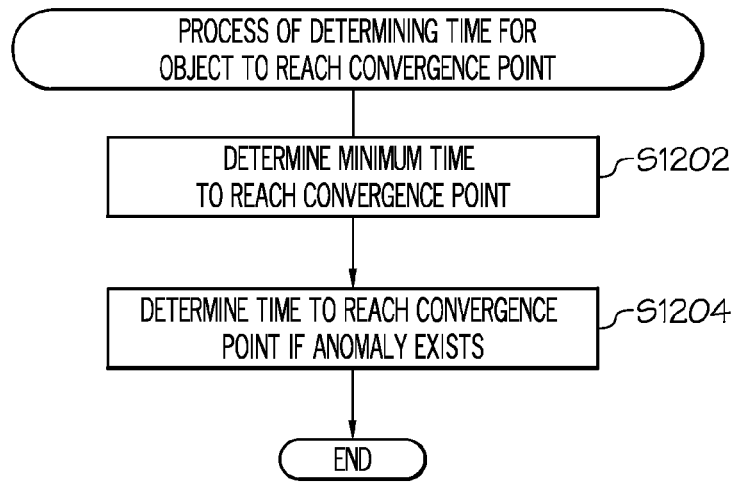

With reference to FIG. 12, a flow-chart for a method of establishing convergence points and time to convergence of objects in motion is shown. At step S1202, a minimum time to reach the convergence point is determined. Such a determination may represent a "best case scenario." Several minimum times to reach convergence point can be determined for each available convergence point. Determining several minimum times enables users or other systems to select the most convenient convergence points and times for convergence based on policies or other factors. At step S1204, anomalies are determined with reference to other system sensors and data. For example, a low fuel level can be determined at one of the objects. The low fuel level may render traveling over a predetermined distance impossible for one of the objects. Accordingly, such an anomaly can impact the time and convergence point analysis. As another example, a tire pressure sensor indicates one of the objects can no longer productively travel. Accordingly, the time and convergence point analysis may be impacted based on such an anomaly.

Figure 13:
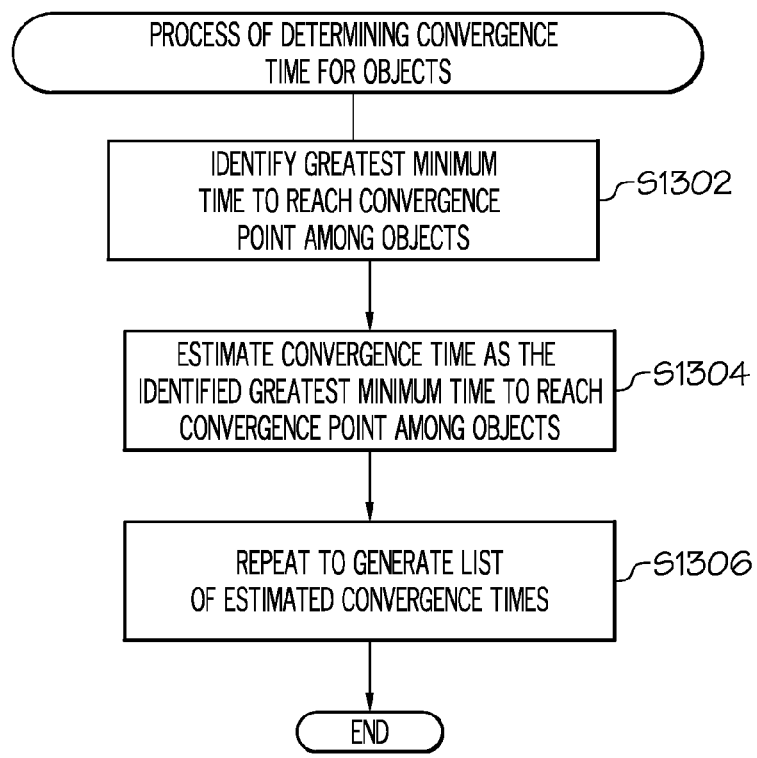

With reference to FIG. 13, a greatest minimum time required to reach each convergence point is determined with respect to each object at step S1302. For example, users associated with numerous vehicles decide that they'd like to meet at a mutually convenient location. The system receives location and capability information from each user and determines one or more potential convergence points. The system estimates the time and object associated with the greatest minimum time to reach the convergence point. In other words, the system estimates the object that will likely take the longest to arrive at each of the convergence points. At step S1304, this greatest minimum time is selected as the estimated convergence time for the group to meet at the convergence point. This information can be distributed to each object (e.g., group member) to determine whether they would like to meet at the convergence point. For example, if the time to convergence is too great, some members may decide not to meet at the convergence point.

Figure 15:
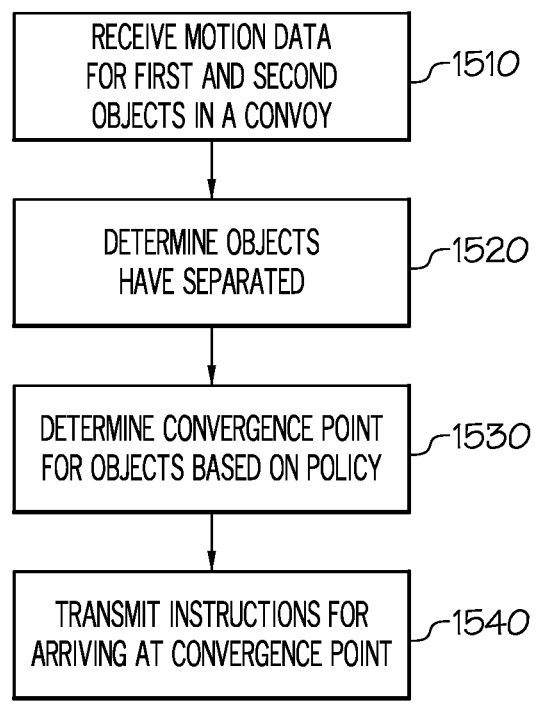
FIG. 15 is a flow chart for a method for determining divergence between coordinated objects and establishing policy-based convergence points.

With reference to FIG. 15, a flow chart for a method for determining divergence between coordinated objects and establishing policy-based convergence points is illustrated in accordance with an embodiment of the present disclosure. At step 1510, motion data is received for first and second objects traveling in a convoy. For example, certain objects, such as vehicles, may travel together for various reasons. For example, a group of friends drive from the city to a beach together. Each of the individuals has a mobile device with location sensors that has subscribed to a service for coordinating travel with his/her friends. For example, the individual identifies other friends which are tracked via one or more location sensors, such as via mobile devices they are associated with. The individuals wish to travel in a convoy. For example, some users may not know the route to get from the city to the destination. In this case, it may be useful to travel together so that other users can lead the way. As another example, the friends may wish to coordinate arrival time at the destination. As another example, the users may wish to share in the experience of traveling together. In yet another example, members of a marine reconnaissance team wish to travel in a convoy during an information gathering mission. Safety and other mission objectives may be furthered by traveling in a convoy. As yet another example, an armored car making deliveries to one or more banks travels in a convoy in order to increase security. The teachings of the present disclosure present systems and methods that enable such users to travel together in a convoy, and assist in remediation of divergent convoy members in an efficient manner or according to a policy. In certain embodiments, motion data from each object associated with the convoy is received.

At step 1520, a determination is made as to whether particular objects have separated or diverged from the convoy. A baseline movement can be established. In certain embodiments, the baseline movement corresponds to a predetermined convoy path. For example, the system generates a route based on analysis of terrain, environmental features, and capabilities of each object participating in the convoy. The route can be transmitted to each object participating in the convoy as a reference so that the object can navigate along the path. In certain embodiments, the baseline movement is defined based on the movement of a first object. For example, one or more objects may be designated as leaders of the convoy. The baseline movement can also be established with reference to a real-time third-party position monitoring and navigation system (e.g., drone monitoring and command center navigation).

Once the baseline movement is established, movement of other objects is compared to the baseline movement to determine deviations from the baseline movement. In certain embodiments, a correlation rule is applied based on the baseline movement and the motion data for other objects that are participating in the convoy. The correlation rule may have a cluster or correlation threshold set. For example, this threshold may be set in a policy file that specifies mission specific variables. In certain embodiments, the correlation rule may be set strictly. For example, during critical missions where security is prioritized, the threshold may be set very low. This may result in keeping the objects close together throughout the mission. In other examples where security is less critical such as the example described above involving friends driving from the city to the beach, the cluster tolerance can be quite large.

In certain embodiments, step 1520 may use status or capability data received from one or more of the objects. For example, status data may indicate that an object is not able to travel further due to some disability, such as low fuel or a blown tire. In this instance, the divergence can be determined before location data evidences the divergent object. For example, the system can predict an vehicle without rugged-terrain capabilities will not be able to traverse upcoming rocky terrain. The system can pre-emptively determine a divergence between the objects in the convoy and proceed to determining a convergence point for the convoy so the one object can avoid the off-road terrain.

At step 1530, after determining that one or more of the objects have separated from the convoy, the system determines one or more convergence points for convergence of the objects based on a policy. The policy can specify various factors relevant in the determination of the convergence point. For example, consider a situation where particular objects are low on fuel, and cannot reach the destination point if they are forced to deviate from a shortest path to the destination point. In this example, the policy may specify that, for objects with low fuel levels, a relative level of urgency associated with arriving at the destination is higher than the level of urgency associated with converging with the other objects. Accordingly, the system may determine that no suitable convergence point exists, or may suggest convergence points that do not require the objects that are low on fuel to deviate from the shortest path to the destination. As another example, certain objects carrying precious cargo may be considered to be in danger or in peril if they travel alone. Accordingly, a convergence point that minimizes those objects' exposure is determined. In certain embodiments, the policy specifies which objects carry sensitive cargo. Thus, if one of the other objects is separated from the convoy, the determination may be made not to create a convergence point for the separated object because that object does not carry any sensitive cargo. In certain embodiments, cargo information can be transmitted from objects. For example, cargo may be transferred to other objects in the convoy. As an example, an object that is low on fuel transfers cargo to another object in the convoy. The system is updated as to the transfer. Thus, when the policy is considered, the system may take into account the newly provided or updated information regarding cargo.

At step 1540 instructions are transmitted to each object associated with the convoy. For example, a list of directions include street names, turns, direction, and the like are transmitted to each object so that an operator of the object, or of a vehicle associated with the object, can direct the object to the convergence point. In certain embodiments, the instructions may specify wait times. For example, if it is determined that one object will have a long wait time at a particular convergence point while it waits for a more remote object, the system may suggest that the object wait at the current position which may be considered safer than the convergence point. In certain embodiments, the instructions are determined with reference to a policy, environment information, terrain data, object sensor data, capability data, and the like.

The flowcharts and diagrams in FIGS. 1-15 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
applying a correlation rule defining a correlation relationship between a first and second object;
determining, using a processor, whether a first motion vector of the first object is correlated at a threshold level of correlation with a second motion vector of the second object, the correlation relationship between the first and second objects identifying the threshold level of correlation between the first and second motion vectors;
in response to determining that the first motion vector is not correlated at the threshold level with the second motion vector, determining a convergence point for the first and second objects in accordance with a policy; and
transmitting instructions for arriving at the convergence point to the first and second objects.

2. The method of claim 1,
wherein, further in response to determining that the first motion vector is not correlated at the threshold level with the second motion vector:
determining a new convoy path from the convergence point to a destination point of a predetermined convoy path.

3. The method of claim 1, further comprising:
determining a first amount of time for the first object to reach the convergence point;
determining a second amount of time for the second object to reach the convergence point; and
determining an estimated amount of time to convergence between the first object and the second object.

4. The method of claim 1,
wherein the policy specifies a level of urgency for convergence of the first and second objects, the level of urgency defining an upper bound on an amount of time that the first and second object can be outside the threshold level of correlation.

5. The method of claim 1,
wherein the first and second object are part of a convoy of a plurality of other objects traveling along a predetermined convoy path terminating at a destination point.

6. The method of claim 5,
wherein the policy prioritizes, in the event that the first and second objects become separated, arriving at the destination point in a shortest possible time over converging with the first or second object in the shortest possible time.

7. The method of claim 5,
wherein the policy prioritizes, in the event that the first and second objects are determined to be outside the threshold level of correlation, converging with the first or second object in a shortest possible time at the expense of arriving at the destination point in the shortest possible time.

8. The method of claim 1,
wherein the correlation rule is an asymmetrical correlation rule that further defines a baseline movement for the first object.

9. The method of claim 8, further comprising:
determining whether the first object is within the baseline movement; and
in response to determining that the first object is not within the baseline movement:
determining a convergence point for the first and second objects in accordance with the policy.

10. The method of claim 2,
wherein, in response to receiving information regarding travel on the new convoy path, determining a third convoy path for the first and second objects between a current location of the first and second objects and the destination point.

11. The method of claim 10,
wherein determining the third path comprises:
analyzing terrain between the current location and the destination point; and
determining a secure path for traversing the terrain between the convergence point and the destination point.

12. The method of claim 1, further comprising:
determining a first path for the first object to reach the convergence point based on the policy; and
determining a second path for the second object to reach the convergence point,
wherein the instructions describe the first and second paths.

13. The method of claim 12,
wherein determining the first path for the first object comprises analyzing terrain between the first object and the convergence point and determining a secure path between the first object and the convergence point based on the terrain and capabilities of the first object.

14. The method of claim 1,
wherein the first object is an automobile, and wherein determining whether a first motion vector of the first object is correlated at the threshold level of correlation with a second motion vector of the second object is based in part on status data for the first object, the status data indicating that the automobile is disabled.

15. The method of claim 14,
wherein the status data comprises:
fuel level;
tire pressure; and
average speed.

16. The method of claim 1,
wherein the policy is configured to minimize travel time for the first object to reach a destination point, and
wherein the convergence point is determined in coordination with the policy to minimize travel time for the first object.

17. A non-transitory computer readable storage medium storing instructions that are executable to cause a system to perform operations comprising:
- applying a correlation rule defining a correlation relationship between a first object and a predetermined convoy path;
- determining whether a first motion vector of the first object is correlated at a threshold level of correlation with the predetermined convoy path, the correlation relationship identifying the threshold level of correlation between the first motion vector and the predetermined convoy path;
- in response to determining that the first motion vector is not correlated at the threshold level, determining a convergence point for the first object and a second object in accordance with a policy,
- wherein the policy is configured to minimize time where the first object is separated from the second object, and
- wherein the convergence point is determined in coordination with the policy to minimize time that the first object is separated from the second object; and
- transmitting instructions for arriving at the convergence point to the first and second objects.

18. The computer readable storage medium of claim 17, wherein the instructions are further executable to cause the system to perform:
- determining a first path for the first object to reach the convergence point based on the policy; and
- determining a second path for the second object to reach the convergence point,
- wherein the instructions describe the first and second paths.

19. The computer readable storage medium of claim 18, wherein the convergence point corresponds to a position of the first object, and
wherein the second path for the second object to arrive at the convergence point is determined to minimize travel distance for the second object.

20. A computer comprising:
a processor; and
a non-transitory computer-readable storage medium storing computer-readable instructions that are executable by the processor to cause the computer to perform:
- applying a correlation rule defining a correlation relationship between a first object and a second object;
- determining whether a first object is correlated at a threshold level of correlation with a second object, the correlation relationship between the first and second objects identifying the threshold level of correlation between the first and second objects;
- in response to determining that the first object is not correlated at the threshold level with the second object, determining a convergence point for the first and second objects in accordance with a policy;
- determining a deficiency with respect to capabilities of the first object based on the motion data;
- determining instructions for the first and second objects to arrive at the convergence point, wherein determining the instructions comprises analyzing terrain between the first object and the convergence point and determining a secure path between the first object and the convergence point based on the terrain and the deficiency of the first object; and
- transmitting instructions for arriving at the convergence point to the first and second objects.

* * * * *